United States Patent
Sharpe, Jr. et al.

(10) Patent No.: US 9,405,291 B2
(45) Date of Patent: Aug. 2, 2016

(54) SYSTEMS AND METHODS TO MONITOR AN ASSET IN AN OPERATING PROCESS UNIT

(75) Inventors: Joseph Hiserodt Sharpe, Jr., Glen Allen, VA (US); Douglas Cecil White, Houston, TX (US); Gary Thomas Hawkins, Clarendon Hills, IL (US); Timothy Jacob Olsen, Bettendorf, IA (US)

(73) Assignee: FISHER-ROSEMOUNT SYSTEMS, INC., Round Rock, TX (US)

( * ) Notice: Subject to any disclaimer, the term of this patent is extended or adjusted under 35 U.S.C. 154(b) by 746 days.

(21) Appl. No.: 13/563,094

(22) Filed: Jul. 31, 2012

(65) Prior Publication Data

US 2014/0039833 A1   Feb. 6, 2014

(51) Int. Cl.
 *G06F 11/30* (2006.01)
 *G05B 23/02* (2006.01)
 *G05B 19/418* (2006.01)
 *G05B 19/4065* (2006.01)

(52) U.S. Cl.
 CPC ........ *G05B 23/0229* (2013.01); *G05B 19/4184* (2013.01); *G05B 19/4065* (2013.01); *G05B 23/027* (2013.01); *G05B 23/0283* (2013.01); *G05B 2219/31465* (2013.01); *G05B 2219/31472* (2013.01); *G05B 2219/31474* (2013.01); *Y02P 90/14* (2015.11)

(58) Field of Classification Search
 USPC ....................................................... 702/183
 See application file for complete search history.

(56) References Cited

U.S. PATENT DOCUMENTS

| | | | | |
|---|---|---|---|---|
| 6,804,619 B1 * | 10/2004 | Chong et al. | ..................... | 702/84 |
| 6,993,396 B1 * | 1/2006 | Gerry | ............... | 700/36 |
| 2002/0077711 A1 * | 6/2002 | Nixon et al. | .................... | 700/51 |
| 2003/0074159 A1 * | 4/2003 | Bechhoefer et al. | .......... | 702/181 |
| 2004/0199362 A1 * | 10/2004 | Cao et al. | ...................... | 702/185 |
| 2004/0260408 A1 * | 12/2004 | Scott et al. | ..................... | 700/20 |
| 2005/0007249 A1 * | 1/2005 | Eryurek et al. | ............... | 340/511 |
| 2005/0253701 A1 * | 11/2005 | Parello et al. | ................. | 340/517 |
| 2008/0009977 A1 * | 1/2008 | Krishnan et al. | ............. | 700/266 |
| 2009/0249128 A1 * | 10/2009 | Heckman et al. | ............... | 714/47 |

FOREIGN PATENT DOCUMENTS

| | | |
|---|---|---|
| WO | 02071170 | 9/2002 |
| WO | 2006093746 | 9/2006 |

OTHER PUBLICATIONS

UK Intellectual Property Office, "Search Report" issued in connection with corresponding Great Britain Application No. GB1313533 on Feb. 3, 2014. (4 pages).

* cited by examiner

*Primary Examiner* — Paul D Lee
(74) *Attorney, Agent, or Firm* — Hanley, Flight & Zimmerman

(57) ABSTRACT

Systems and methods to monitor an asset in an operating process unit are disclosed. An example method includes monitoring one or more equipment parameters associated with an asset in an operating process unit, monitoring one or more process parameters associated with the asset, and determining an asset health value corresponding to the asset based on the one or more monitored equipment parameters, process parameters, and baseline data associated with the one or more equipment parameters.

20 Claims, 13 Drawing Sheets

SYSTEMS AND METHODS TO MONITOR AN ASSET IN AN OPERATING PROCESS UNIT

FIELD OF THE DISCLOSURE

This disclosure relates generally to operating process units and, more particularly, to systems and methods to monitor an asset in an operating process unit.

BACKGROUND

Process operations, like those used in the oil and gas production industry, typically include significant equipment assets, such as pumps, heat exchangers, cooling towers, etc. The condition, health, integrity, and/or performance of such assets are essential to the efficiency and/or safety of processing plants.

SUMMARY

Systems and methods to monitor an asset in an operating process unit are disclosed. An example method includes monitoring one or more equipment parameters associated with an asset in an operating process unit, monitoring one or more process parameters associated with the asset, and determining an asset health value corresponding to the asset based on the one or more monitored equipment parameters, process parameters, and baseline data associated with the one or more equipment parameters.

An example system includes sensors to monitor one or more equipment parameters and one or more process parameters associated with an asset in an operating process unit and a processor to receive data collected via the sensors and to calculate an asset health value of the asset based on the one or more equipment parameters and the one or more process parameters.

DETAILED DESCRIPTION

Figure 1:
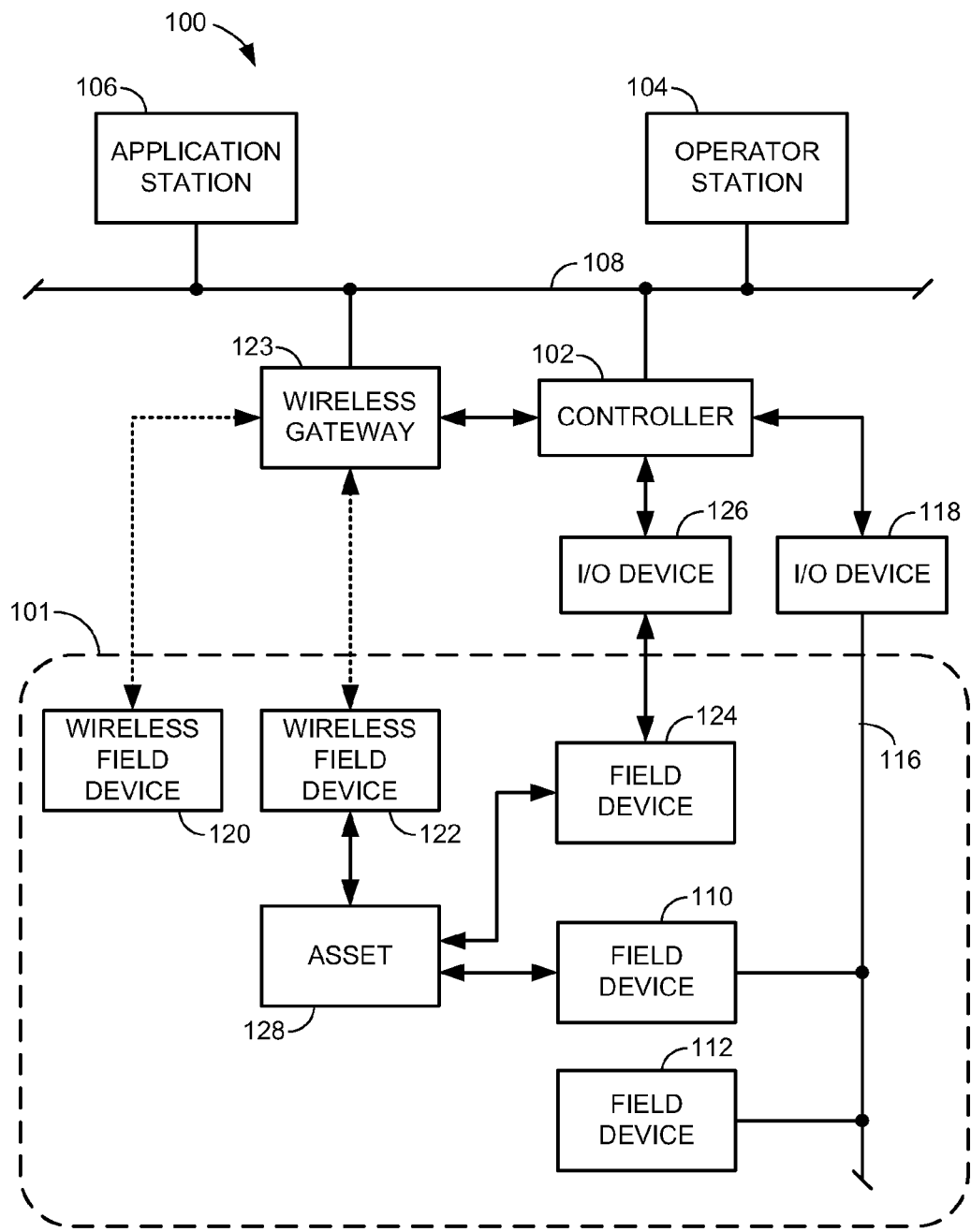
FIG. 1 is a schematic illustration of an example operating process unit within which the teachings of this disclosure may be implemented.

Industry averages suggest that roughly five percent of production capacity is lost each year due to unplanned downtime. One of the most significant causes for such downtime is equipment failure, which can often exceed forty percent of unplanned downtime. Not only can an unexpected failure lead to lost production and increased maintenance costs, in some circumstances, an equipment failure may result in fires, environmental release of noxious materials, and/or other unsafe circumstances. While known operating process units may monitor the most critical equipment by using sensors that communicate with a host system, it is often cost prohibitive to monitor all assets online and/or in real-time. Accordingly, the remaining equipment is manually checked through clipboard workarounds and periodic handheld measurement and monitoring devices to obtain isolated data concerning the condition, health, integrity and/or performance of the equipment or asset. The result of this known, manual approach is that many assets within an operating process unit are running without being monitored most of the time, thereby increasing the risk of failures, leaks, fires, and/or other undesirable impacts on the performance and/or safety of the entire system. At least these obstacles are overcome by the teachings of this disclosure.

Avoiding equipment damage, environmental incidents, and/or negative impacts on business as described above depends on being able to detect changes in process variables and/or equipment conditions as they occur (i.e., in substantially real-time via online monitoring). Furthermore, being able to relate multiple measurements provides greater predictive value in assessing the likelihood of the onset of asset failures as it provides a more complete picture of the condition of the asset. Thus, even where individual measurements on a particular piece of equipment are collected, the engineer collecting the measurements is unlikely to appreciate the significance of the individual measurements in light of other parameters associated with the asset. For example, a pump may be periodically inspected to measure whether it is operating within acceptable vibrational limits. However, when such a measurement is made in the field, there is no way of correlating this with other measurements, such as flow rate and/or other parameters that are being monitored in connection with the operating process unit. Without having all this information available and properly understood, these individual measurements will have less value in determining the present health of the asset and/or anticipating impending failures than when multiple measurements are integrated into a comprehensive view of the overall condition of the asset. Such systems and methods, as disclosed herein, recognize that, while there are many potential causes of equipment failures, it is possible to combine specific equipment health measurements with process measurements to make a more sophisticated or integrated analysis of what might be occurring than what is known in the art. Using this integrated analysis, the system and methods described herein enable the determination of an overall asset health status or value and the identification of the most critical parameters affecting the condition of an asset to an operator, engineer, maintenance staff, and/or other plant personnel (hereinafter collectively referred to as an operator). Furthermore, the teachings of this disclosure involve systems and methods that provide an earlier detection of potential asset failures than is known in the art by the integration of measurements that are sensitive to likely failure modes, including both equipment and process data, analysis of the combined or integrated information to produce an overall indication of the likelihood of a near term failure, and presentation to operators in a manner that permits them to quickly understand the state of the asset and the possible failure.

FIG. 1 is a schematic illustration of an example system 100 implementing an operating process unit 101 in accordance with the teachings of this disclosure. The example system 100 may be a distributed control system (DCS), a supervisory control and data acquisition (SCADA) system and/or any other type of process system that monitors and/or controls the example operating process unit 101. Additionally or alternatively, the example operating process unit 101 may be monitored and/or associated with an asset management system (AMS) regardless of whether the system 100 is providing any control of the operating process unit 100. As illustrated in FIG. 1, the example system 100 includes one or more process controllers (one of which is designated at reference numeral 102), one or more operator stations (one of which is designated at reference numeral 104), and one or more application stations (one of which is designated at reference numeral 106). The example process controller 102, the example operator station 104 and the example application station 106 are communicatively coupled via a bus and/or local area network (LAN) 108, which is commonly referred to as an area control network (ACN).

The example operator station 104 of FIG. 1 allows an operator to review and/or operate one or more operator display screens and/or applications that enable the operator to view process control system variables, states, conditions, alarms; change process control system settings (e.g., set points, operating states, clear alarms, silence alarms, etc.); configure and/or calibrate devices within the operating process unit 101; perform diagnostics of devices within the operating process unit 101; and/or otherwise manage and interact with devices within the operating process unit 101.

The example application station 106 of FIG. 1 may be configured to perform one or more information technology applications, user-interactive applications and/or communication applications. For example, the application station 106 may be configured to perform primarily process control-related applications, while another application station (not shown) may be configured to perform primarily communication applications that enable the operating process unit 101 to communicate with other devices or systems using any desired communication media (e.g., wireless, hardwired, etc.) and protocols (e.g., HTTP, SOAP, etc.). In some examples, a remote session may be established on the example application station 106 to view and/or interact with the applications on the example operator station 104. Additionally, the example application station 106 and/or the example operator station 104 may include and/or implement an asset monitoring application (e.g., the example asset monitoring application of FIG. 2) that may be part of an asset management software (AMS) application. The asset monitoring application is associated with a user interface (e.g., the example user interface of FIG. 2) to display information and/or provide visual indications of the condition, health, integrity, and/or performance of assets within the operating process unit 101. An example manner of implementing the example application station 106 of FIG. 1 is described below in connection with FIG. 2.

The example operator station 104 and the example application station 106 of FIG. 1 may be implemented using one or more workstations and/or any other suitable computer systems and/or processing systems. For example, the operator station 104 and/or application station 106 could be implemented using single processor personal computers, single or multi-processor workstations, etc. Furthermore, the example operator station 104 and/or the application station 106 may connect to another network from which other users (e.g., maintenance and/or equipment engineers), via separate workstations, may have access. Additionally or alternatively, the example operating process unit 101 may contain other workstations within the same network (e.g., a maintenance station and/or an engineering station) to provide separate functionality associated with the operating process unit 101.

The example LAN 108 of FIG. 1 may be implemented using any desired communication medium and protocol. For example, the example LAN 108 may be based on a hardwired and/or wireless Ethernet communication scheme. However, any other suitable communication medium(s) and/or protocol(s) could be used. Further, although a single LAN 108 is illustrated in FIG. 1, more than one LAN and/or other alternative communication hardware may be used to provide redundant communication paths between the example systems of FIG. 1.

The example controller 102 of FIG. 1 is coupled to a plurality of smart field devices 110, 112 via a data bus 116 and an input/output (I/O) device 118, such as an I/O card communicatively coupled to the controller 102. In some examples, the smart field devices 110, 112 may be Fieldbus compliant valves, actuators, sensors, etc., in which case the smart field devices 110, 112 communicate via the data bus 116 using the well-known Foundation Fieldbus protocol. Of course, other types of smart field devices and communication protocols could be used instead. For example, the smart field devices 110, 112 could instead be Profibus and/or HART compliant devices that communicate via the data bus 116 using the well-known Profibus and HART communication protocols. Additional I/O devices (similar and/or identical to the I/O device 118) may be coupled to the controller 102 to enable additional groups of smart field devices, which may be Foundation Fieldbus devices, HART devices, etc., to communicate with the controller 102.

As shown in the illustrated example, other smart field devices 120, 122 may be wireless devices that relay data to a wireless gateway 123. In some such examples, the wireless gateway 123 interfaces with the controller 102 (e.g., via a wireless I/O card). Using such wireless technology, enables the reduction in cost and complexity of wiring and configuring hardwired cables for each device. Additionally or alternatively, in some examples, the wireless gateway 123 connects directly to the ACN (e.g., the LAN 108) to enable transmitted data to be read directly by the application station 106 using Object Linking and Embedding (OLE) for Process Control (OPC). Accordingly, while the teachings of this disclosure may be implemented in connection with a process control system (e.g., via the example controller 102), the teachings of this disclosure may also be implemented completely independent of a process control system.

In addition to the example smart field devices 110, 112, 120, 122 one or more non-smart field devices 124 may be communicatively coupled to the example controller 102. The example non-smart field devices 124 of FIG. 1 may be, for example, conventional 4-20 milliamp (mA) or 0-24 volts direct current (VDC) devices that communicate with the controller 102 via respective hardwired links connected to corresponding I/O cards (e.g., represented by the I/O device 126) associated with the controller 102. In the illustrated example of FIG. 1, at least some of the smart field devices 110, 122 and/or some of the non-smart field devices 124 may be associated with a particular asset 128 to monitor and/or control parameters associated with the asset 128 in the operating process unit 101. The asset 128 may be any asset within an operating process unit such as a pump, a heat exchanger, an air cooled exchanger, a furnace, a fired heater, a blower, a fin fan, a cooling tower, a distillation column, a compressor, a pipe, a valve, a vessel, a well head, a tank, a boiler, a steam trap, dryer, kiln, reactor, oil fractionator, separator, desalter, crusher, smelter, cyclone, or a centrifuge, etc. In some examples, the field devices 110, 122, 124 may be directly integrated with the asset 128. In other examples, the field devices 110, 122, 124 may be separate devices that may be in communication with, or otherwise interact with, the asset 128. Furthermore, others of the field devices 112, 120 in the illustrated examples may be configured to monitor and/or control other components within the operating process unit 101.

The example controller 102 of FIG. 1 may be, for example, a DeltaV™ controller sold by Fisher-Rosemount Systems, Inc., an Emerson Process Management company. However, any other controller could be used instead. Further, while only one controller 102 is shown in FIG. 1, additional controllers and/or process control platforms of any desired type and/or combination of types could be coupled to the LAN 108. In any case, the example controller 102 performs one or more process control routines associated with the system 100 that have been generated by a system engineer and/or other system operator using the application station 106 and which have been downloaded to and/or instantiated in the controller 102.

While FIG. 1 illustrates an example system 100 within which the methods and apparatus to assess the condition, health, integrity, and/or performance of an asset and/or the likelihood of the onset of potential asset failures described in greater detail below may be advantageously employed, the methods and apparatus to control information presented to operators and/or engineers described herein may, if desired, be advantageously employed in other process plants and/or operating process units of greater or less complexity (e.g., having more than one controller, across more than one geographic location, etc.) than the illustrated example of FIG. 1.

Figure 2:
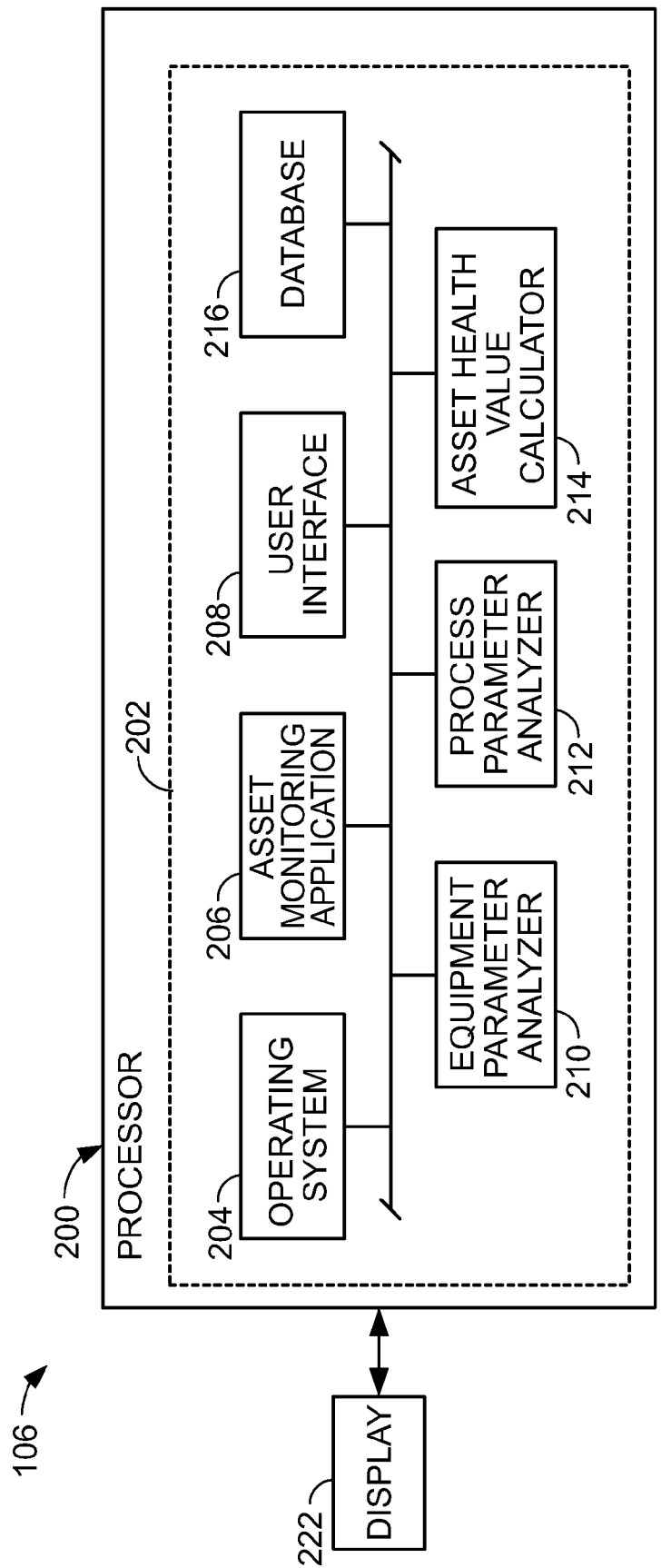
FIG. 2 illustrates an example manner of implementing the example operator station of FIG. 1.

FIG. 2 illustrates an example manner of implementing the example application station 106 of FIG. 1. While the following description is provided with respect to the application station 106, the example manner of implementing the example application station 106 may also be used to implement the example operator station 104 of FIG. 1. The example application station 106 of FIG. 2 includes at least one programmable processor 200. The example processor 200 of FIG. 2 executes coded instructions present in a main memory 202 of the processor 200 (e.g., within a random-access memory (RAM) and/or a read-only memory (ROM)). The processor 200 may be any type of processing unit, such as a processor core, a processor, a microcontroller, and/or any type of personal computer (PC). The processor 200 may execute, among other things, an example operating system 204, an example asset monitoring application 206, an example user interface 208, an example equipment parameter analyzer 210, an example process parameter analyzer 212, an example asset health value calculator 214, and an example database 216. An example operating system 210 is an operating system from Microsoft®. The example main memory 202 of FIG. 2 may be implemented by and/or within the processor 200 and/or may be one or more memories and/or memory devices operatively coupled to the processor 200.

To allow operators to interact with the example processor 200, the example application station 106 of FIG. 2 includes any type of display 222. Example displays 222 include, but are not limited to, a computer monitor, a computer screen, a television, a mobile device (e.g., a smart phone, a Blackberry™, an iPhone™, and/or an industrial portable PC), etc., capable of displaying user interfaces and/or applications implemented by the processor 200 and/or, more generally, the example operator station 104. The example operating system 204 of FIG. 2 displays and/or facilitates the display of the example user interface 208 associated with the example asset monitoring application 206 by and/or at the example display 216. Aspects of the example user interface 208 are described below in greater detail in connection with FIGS. 3-11.

The example asset monitoring application 206 receives data via one or more of the field devices 110, 112, 114, 120, 122 of FIG. 1 measuring parameters associated with the operating process unit 100 and/or, more particularly, parameters associated with the operation and/or integrity of assets within the operating process unit (e.g., the example asset 128 of FIG. 1). Parameters associated with the condition, state, health, integrity, and/or performance of a piece of equipment (i.e., asset) are herein referred to as equipment parameters. For example, for rotary assets (e.g., pumps, fans, blowers, compressors, etc.) equipment parameters may correspond to a speed of rotation, a vibration, a temperature of a bearing, an oil level, a seal leak, etc. Parameters associated with the operation and/or control of an operating process unit, are herein referred to as process parameters. Examples of process parameters include measurements corresponding to parameters such as temperature, pressure, flow rate, etc. In some examples, measured parameters may be relevant to both the condition and/or integrity of an asset as well as the operation and/or control of a process within which the asset is running. For example, the temperature and chemical composition (e.g., pH level) of a liquid in a tank or vessel may serve as process variables in an operating process unit (i.e., process parameters), but they may also serve as variables used to assess the corrosive impact of the liquid on the vessel (equipment parameters).

In the illustrated example, the example equipment parameter analyzer 210 analyzes input data received via the asset monitoring application 206 that is associated with equipment parameters. In the illustrated example, the equipment parameter analyzer 210 may compare the monitored value of each equipment parameter to a reference value or baseline for the parameter and a preconfigured limit for the parameter. In some examples, the baseline data for an equipment parameter may be defined by an operator. In other examples, the equipment parameter analyzer 210 may capture the baseline data from measured values of the equipment parameters during operating conditions of the asset where an operator, for example, indicates the asset is operating correctly (e.g., during normal operating conditions). In some examples, the baseline data is captured soon after a device is configured and first put into operation to reduce the impact of wear and/or degradation in conditions of the asset after extended use. In some instances, a particular asset may have multiple conditions and/or operational states within which it functions. Accordingly, in some such examples, different baseline data may be captured or otherwise defined to be applied for each respective operational state of the asset. Furthermore, some equipment assets may not have discrete operational states but instead, may vary depending on some other variable state parameter. For example, vibrations of a pump may vary as a function of the speed at which the pump is running. Thus, the baseline data for vibrations may vary over a range of speeds over which the pump operates. Accordingly, in some examples, where an equipment parameter is dependent on a variable state parameter, a characteristic curve or signature is captured to serve as dynamic baseline data of normal operating conditions for each monitored parameter as a function of the variable state parameter.

In some examples, the limit for an equipment parameter may be defined by an operator. In other examples, the equipment parameter analyzer 210 may calculate the limit based on the baseline data in accordance with standards guidelines. For example, vibrations of rotary assets are measured based on the speed of rotation of the asset and vibration limits may be calculated as a function of the speed in accordance with rotary equipment guidelines set by the International Electrotechnical Commission (IEC). In some such examples, the calculated limit may be further adjusted by a multiplying factor configured by an operator based on the particular needs and/or operation of the operating process unit.

From the baseline, limit(s), and monitored value of an equipment parameter, the equipment parameter analyzer 210 may calculate a corresponding equipment health value. An equipment health value is a numerical indication of the severity of deviation of a corresponding equipment parameter from its expected value (e.g., its baseline). In particular, the equipment health value indicates the relative position of the equipment parameter within the range between its corresponding baseline and limit(s). As different equipment parameters may have different baselines and different limits, in some examples, the equipment health value for each parameter may be normalized such as, for example, by indicating the relative position of the value of the equipment parameter as a percentage along the defined range. In some examples, the percentage may be the complement of the relative deviation from the baseline data. That is, the greater the deviation, the lower the percentage. For example, an equipment parameter with a value at its corresponding baseline (i.e., no deviation) would have an equipment health value of 100% (indicating the asset is operating as expected) while an equipment parameter having a value corresponding to limit would have an equipment health value of 0%.

The example process parameter analyzer 212 analyzes input data received via the asset monitoring application 206 that is associated with process parameters. In many known operating process units, process parameters are controlled so that they substantially maintain values corresponding to a preconfigured set point or point of normal operating conditions (e.g., as defined by baseline data). However, there are times where the parameters may deviate from the set point or where the set points are improperly configured for a given asset operation. Significant deviations may impact the production process and/or create unsafe plant conditions. Accordingly, process parameters may be assigned one or more alarm limits that may be tripped (i.e., become active) when a corresponding process parameter passes its associated alarm limits. In some examples, the alarm limits are calculated from the baseline data in a similar manner described above for equipment parameters. However, while the significance of equipment parameters depend upon the relative position of the parameter value between its baseline and corresponding limit, process parameters are significant when the parameter value passes the corresponding limit (e.g., an alarm is triggered).

Alarm limits may be configured with differing severity. For example, some alarms may be primarily for informational purposes, while others give warnings, and yet others indicate critical conditions. In an operating process unit, there may be multiple active alarms at any given time, many of which provide the same level of alarm severity (e.g., information, warning, critical, etc.). As such, an operator may be unable to identify among all the alarms that which is most severe or the limiting factor in the process system. To overcome this obstacle, the process parameter analyzer 212 in the illustrated example may determine a process health value for each process parameter associated with an active alarm to enable the comparison of the severity of each alarm. A process health value is a numerical indication of the severity or significance of an alarm relative to other alarms. Further, as process health values apply to active alarms (i.e., the corresponding alarms have been triggered), the severity of the alarms in turn indicates the severity of the corresponding issues associated with the asset. More particularly, the process parameter analyzer 212 determines a process health value corresponding to each process parameter based on a weighting of each alarm associated with each process parameter. For example, every potential alarm corresponding to each process parameter associated with an equipment asset may be weighted on a scale of 0 to 1000 with higher numbers representing more severe alarms. Using only integers, such an example enables up to 1000 alarms to be uniquely ranked or ordered relative to one another according to their severity. In some examples, multiple alarms may be assigned the same weight having the same severity. In some examples, the weighting of each alarm is preconfigured for process parameters associated with an asset based on best practices. In some examples, the weighting may be configured and/or adjusted by an operator to enable the operator to isolate and/or focus on alarms of particular interest and/or importance to a particular process or asset.

Additionally, in some examples, the process parameter analyzer 212 may normalize the process health values to the same scale as the equipment health values described above (e.g., reduced to a 100 point scale or percentage) to enable the comparison of all parameters associated with an asset and to quickly assess the overall health of the asset and/or identify the limiting parameter most affecting the condition and/or performance of the asset. The process health values are normalized by reducing the weight of each alarm to a 100 point scale and then subtracting the weight from 100 (i.e., the complement of the scaled weight). For example, if the 0 to 1000 scale described above is used and a particular alarm is given a weight of 745, the weight is reduced to a 100 point scale by dividing by ten (resulting in 74.5) and then subtracting the result from 100 (resulting in 25.5). Thus, the final process parameter health, expressed as a percentage for comparison with the equipment health values, would be 25.5%.

As described above, some parameters may serve both as an equipment parameter (providing information about the condition, integrity, and/or performance of an asset) and as a process parameter (providing information relevant to the operation and control of a process). Indeed, every parameter may be assigned an alarm limit that is monitored within the operating process unit. For example, in addition to monitoring the position of the value of a vibration parameter relative to its baseline and limit(s), an alarm limit may also be defined (the same as or different than the limit for the parameter) that triggers an alarm when the limit is exceeded. Such an alarm may be given a weight as with all other alarms and used to calculate a corresponding process health value. Similarly, any monitored parameter may have a baseline and a limit defined and the relative position along the resulting range monitored to calculate an equipment health value.

Additionally, in the illustrated examples, more complex alarms can be defined that are a function of more than one piece of equipment and/or process parameter. For example, the onset of pump cavitation, which may damage pump impellers and/or seals, may be identified when the vibration of a pump reaches a certain threshold and the standard deviation of the discharge pressure of the pump deviates beyond a corresponding alarm limit. In accordance with the teachings of this disclosure, a complex alarm can be created that is triggered only when both conditions are satisfied. Further, this example complex alarm can then be assigned a certain weight to be used in calculating a corresponding process health value. In this manner, operators of an operating process unit can obtain greater insight to assess the overall condition of an asset than is possible using known methods. Furthermore, integrating the analysis of equipment and process parameters in this manner enables operators to predict the likely onset of potential failures earlier on than with known methods, thereby reducing the cost due to downtime and/or maintenance. For example, the occurrence of process operating conditions that cause equipment degradation can be reduced once the relationships of various parameters are understood and corresponding alarms are configured to alert an operator (e.g., via the operator station 104 of FIG. 1). In the example of pump cavitation, a combination of low suction pressure, high fluid temperature, or high strainer differential pressure may be the root cause of the cavitation. Accordingly, once pump cavitation is identified, as described above, an operator may quickly identify the possible root cause(s) by checking the alarm status of these variables, thereby enabling the operator to then take appropriate remedial action. Without combining all these parameters into an integrated analysis, such a condition and/or the root cause of the condition may go undetected for a significant amount of time.

The example asset health value calculator 214 in the illustrated example analyzes the equipment and process parameter health values associated with a particular asset in the operating process unit to calculate an asset health value indicative of an overall health or integrity of the asset. In accordance with the teachings of this disclosure, the overall health or integrity of an asset is assumed to be no better than the parameter associated with the asset that exhibits the least or worst health (i.e., the lowest health value). That is, the asset health value calculator 214 generates a value corresponding to the lowest value among all of the equipment health values and the process health values. In some examples, the equipment parameter analyzer 210 may determine a lowest equipment health value and the process parameter analyzer 212 may determine a lowest process health parameter such that the asset health value calculator 214 merely identifies the lower of the two values.

The example database 216 of FIG. 2 stores data received via the example asset monitoring application 206 and/or via an operator, which may include baseline data and/or limits for equipment parameters as well as weights associated with alarms for the process parameters. Additionally, the database 216 may store any of the data output via any of the example equipment parameter analyzer 210, the example process parameter analyzer 212, or the example asset health value calculator 214.

While an example manner of implementing the example application station 106 of FIG. 1 has been illustrated in FIG. 2, the data structures, elements, processes and devices illustrated in FIG. 2 may be combined, divided, re-arranged, omitted, eliminated and/or implemented in any other way. Further, the example operating system 204, the example asset monitoring application 206, the example user interface 208, the example equipment parameter analyzer 210, the example process parameter analyzer 212, the example asset health value calculator 214, the example database 216, and/or, more generally, the example application station 106 of FIG. 2 may be implemented by hardware, software, firmware and/or any combination of hardware, software and/or firmware. Further still, the example application station 106 may include additional elements, processes and/or devices instead of, or in addition to, those illustrated in FIG. 2, and/or may include more than one of any or all of the illustrated data structures, elements, processes and/or devices.

Figure 3:
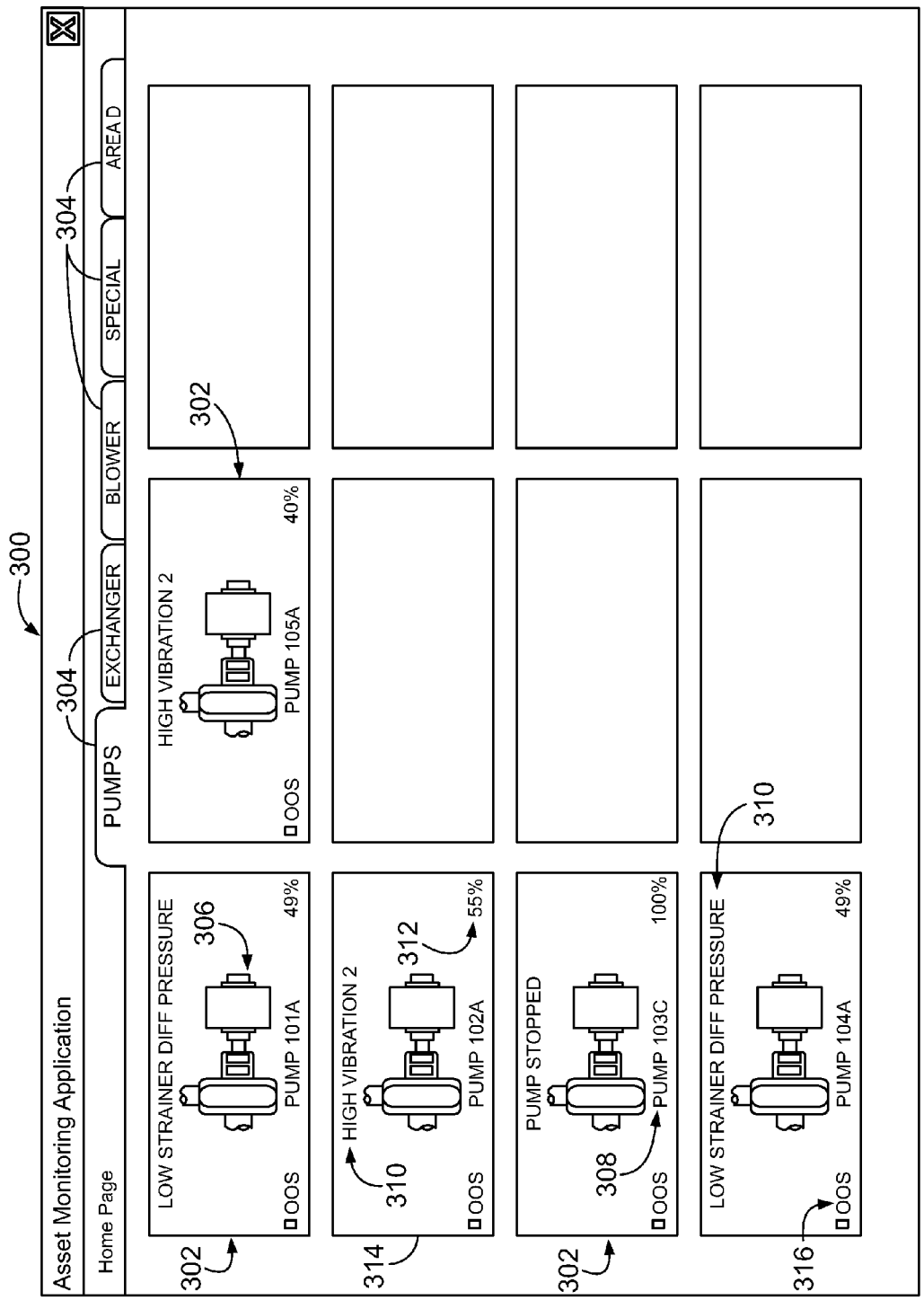
FIG. 3 illustrates an example home page associated with the user interface of the asset monitoring application of FIG. 2.

FIG. 3 illustrates an example overview page or home page 300 associated with the user interface 208 of the asset monitoring application 206 of FIG. 2. In the illustrated example, the home page 300 provides an asset summary graphic 302 for each asset in the operating process unit. In some examples, the asset summary graphics 302 corresponding to each asset may be grouped by process plant, by process area within a particular process plant, and/or by asset type. Further, the asset summary graphics 302 may be separately rendered via the home page 300 under individual tabs 304 associated with each process plant, process area, and/or asset type. For example, as shown in FIG. 3, the selected tab 304 corresponds to pumps (asset type) and shows five asset summary graphics 302 corresponding to five separate pumps.

Each asset summary graphic 302 provides general information regarding the condition, health, and/or performance of the corresponding asset. Specifically, each asset summary graphic 302 may provide an asset image 306 providing a visual representation of the type of asset (e.g., pump, heat exchanger, compressor, etc.). Each asset summary graphic 302 may also include a process tag 308 identifying the particular asset associated with its corresponding graphic 302 to which a particular asset summary graphic corresponds. Additionally, in some examples, the asset summary graphic 302 provides a limiting alarm label 310 that identifies the highest weighted active alarm associated with the asset. As described above, in the illustrated example, a higher weight configured for an alarm is an indication of the severity of the alarm. Thus, the active alarm having the highest weight is an indication of the most serious alarm and, therefore, the limiting alarm corresponding to the particular asset. Furthermore, in some examples, each asset summary graphic 302 provides an indication of the overall health and/or state of the asset by showing an asset health value 312 corresponding to the asset. As discussed above, the asset health value 312 is a numerical indication of the lowest equipment health value or process health value determined for the asset. In the illustrated example, the asset health value 312 is represented as a percentage with 100% being the best health.

In the illustrated example, the asset health values 312 may change appearance depending on the severity of the health. In some examples, the color of the asset health value 312 may change. For example, values above 90% may be shown in green, values above 75% and less than or equal to 90% may be shown in violet, values above 50% and less than or equal to 75% may be shown in yellow, and values less than or equal to 50% may be shown in red. Other colors and/or bounds may be implemented as appropriate. Additionally or alternatively, the asset alarm values 312 may flash, increase in intensity, become highlighted, change size, or otherwise change appearance after passing preconfigured thresholds to enable operators to quickly identify the assets in the most critical conditions. Furthermore, other aspects of the asset summary graphic 302 may change appearance along with the asset health value 312 to further draw attention to assets having poor health. For example, each asset summary graphic 302 may be rendered with a border 314 that may change color or appearance in conjunction with the change in color or appearance of the asset health value 312. Further, any other component of the asset summary graphic may change appearance as described above to assist in drawing the attention of an operator based on any suitable threshold(s) predefined for the asset health value 312. In some examples, different types of changes to the appearance of the asset summary graphic 302 may indicate different things. For example, while a change in color may indicate a change in health, a flashing border may indicate one or more unacknowledged alarms associated with the asset. In a similar manner, the label for each tab 304 may also change color to correspond to the lowest asset health value 312 among all assets configured for the process area associated with the tab 304. Additionally or alternatively, the label for each tab 304 may flash when there are unacknowledged alarms associated with any of the assets configured for the corresponding process area.

The asset summary graphic 302 may include an out of service (OOS) checkbox 316. If selected, a command will issue to bring the asset out of service or back into service depending on its current state. When an asset is taken out of service, all alarms become inactive.

Figure 4:
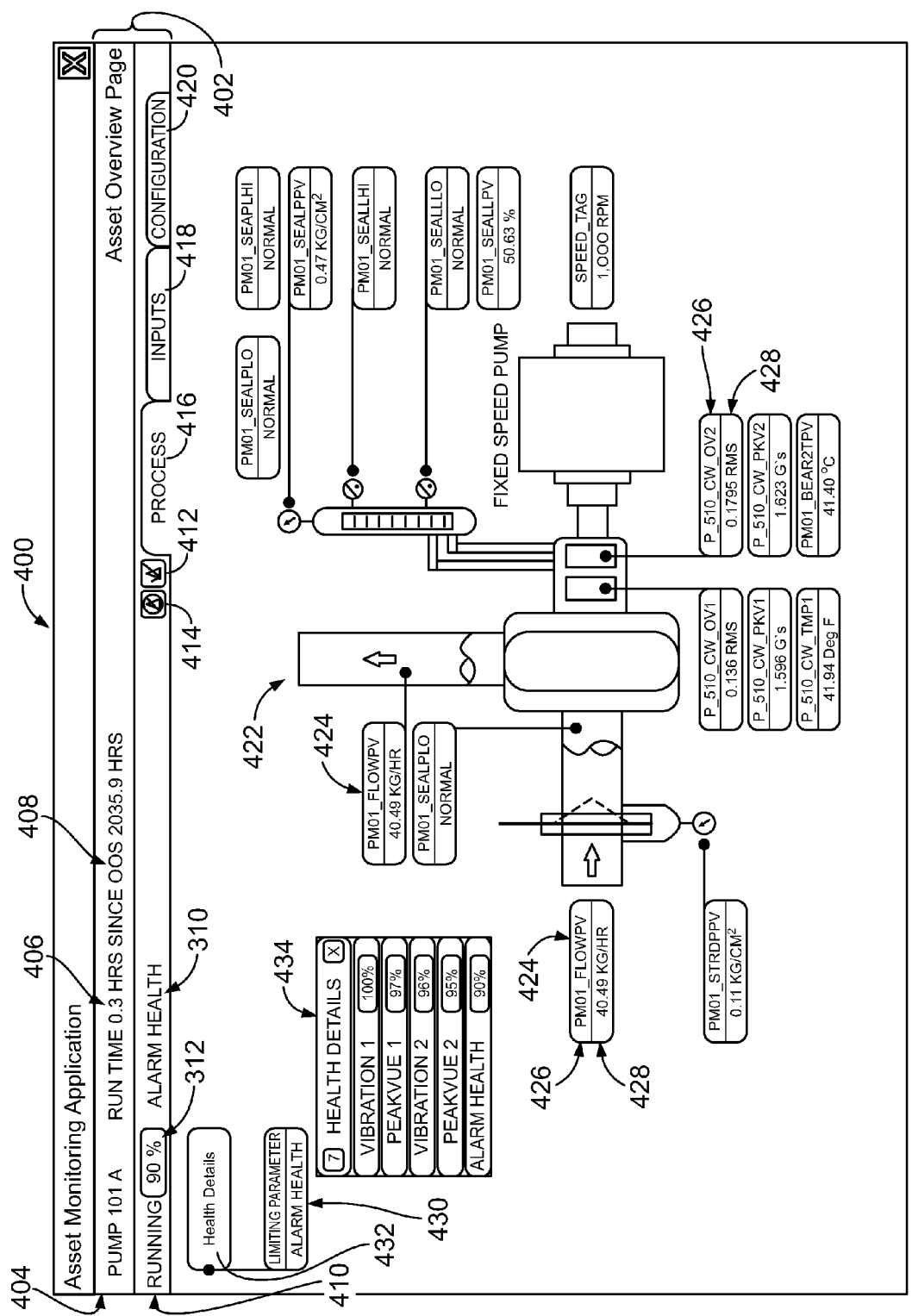
FIG. 4 illustrate an example process tab of an example asset overview page of FIG. 4 associated with the user interface of the asset monitoring application of FIG. 2
Figure 5:
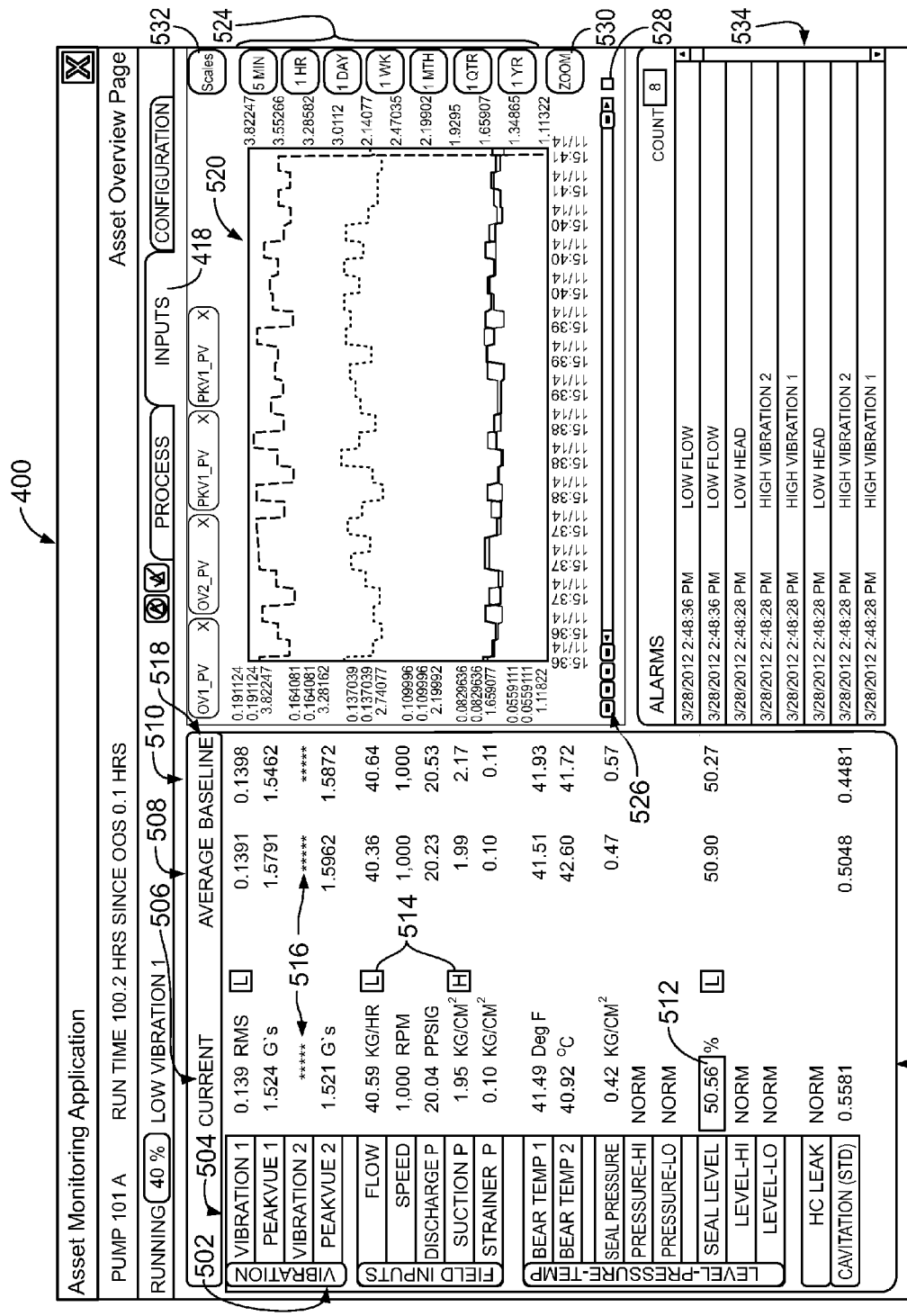
FIG. 5 illustrates an example input tab of the example asset overview page 400 of FIG. 4.
Figure 6:
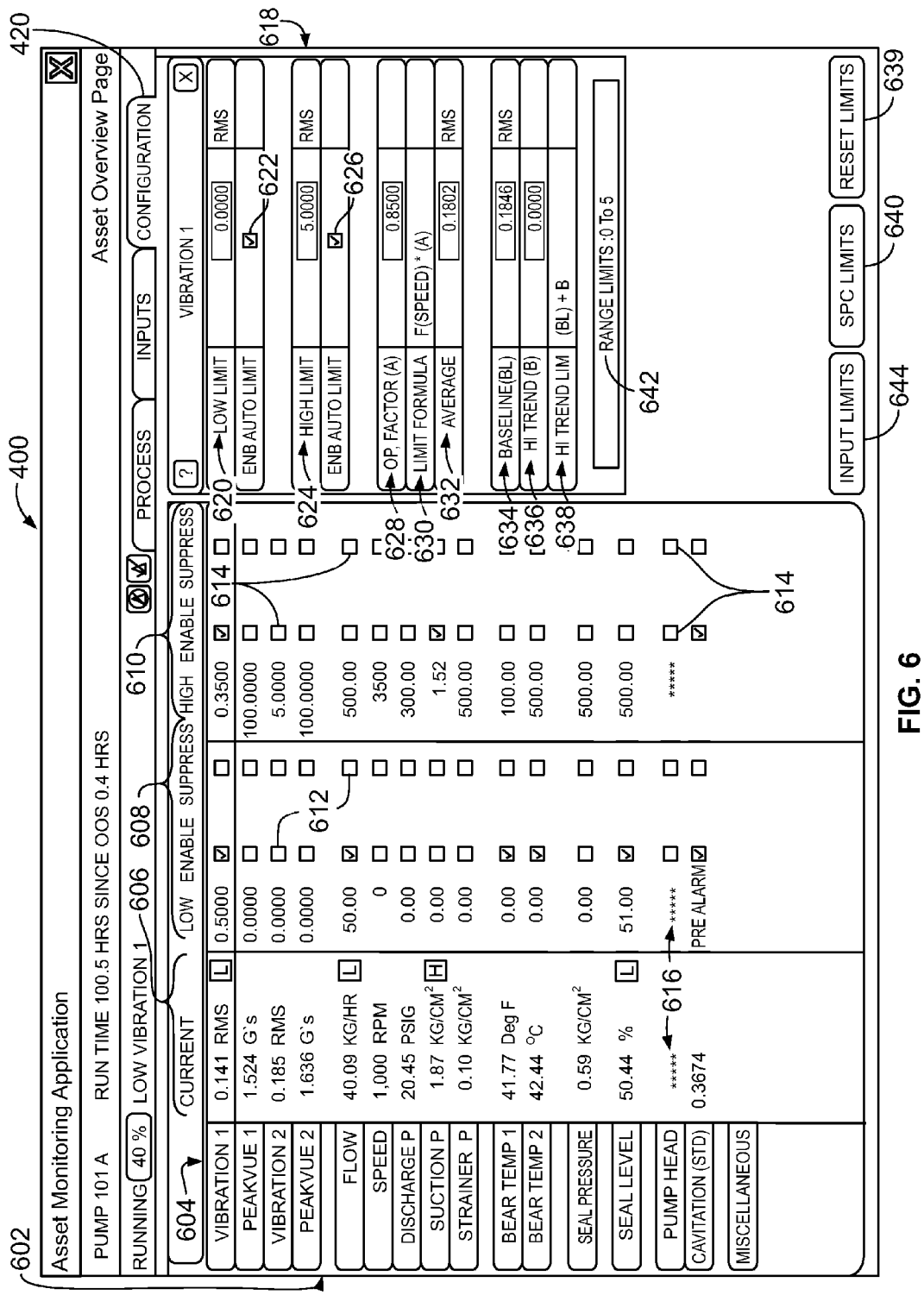
FIG. 6 illustrates an example configuration tab of the example asset overview page of FIG. 4 showing an example alarm configuration window.

FIGS. 4-6 illustrate an example asset overview page 400 of the user interface 208 of FIG. 2 having multiple sub-views or tabs. Each asset within an operating process unit has a corresponding asset overview page 400 that may be accessed by selecting the corresponding asset summary graphic 302 on the home page 300 of FIG. 3. In the illustrated example, each asset overview page 400 includes a process header 402 that contains basic information associated with the asset such as, a process tag 404, a run time 406 indicating the time since the asset last started running, a total running time 408 since the asset was brought into service, an operating status 410 (e.g., Running/Stopped, Active/Inactive, etc.), an alarm acknowledgement button or icon 412, and a silence horn alarm button or icon 414. The header 402 also includes the asset health value 312 and the limiting alarm label 310 described above in connection with FIG. 3. Furthermore, the appearance (e.g., color) of the asset health value 312 and the limiting alarm label 310 in the header 402 of the example asset overview page 400 corresponds to the appearance described above in connection with FIG. 3.

The example asset overview page 400 may have separate sub-views or tabs including a process tab 416 (as shown and described in FIG. 4), an inputs tab 418 (as shown and described in FIG. 5), and a configuration tab 420 (as shown and described in FIG. 6) that enable an operator to view, access, and/or interact with data related to various aspects of the associated asset. The content of the process tab 416 illustrated in FIG. 4 provides a process graphic 422 that shows the asset in connection with the relevant components of the process system. Further, the process graphic 422 shows the process variable dynamo 424 for all field inputs installed on the asset along with their position on the asset. Each dynamo 424 includes a process tag 426 and a current process parameter value 428 along with corresponding units as read from the field or calculated by the system.

In the illustrated example, each dynamo 424 and/or portions thereof may change in appearance based on data associated with the process system. For example, where an alarm associated with a particular process variable is active and unacknowledged, the process variable may blink at a preconfigured frequency (e.g., at one second intervals). Once acknowledged, in the illustrated example, the blinking stops and the process value may change appearance to indicate the severity of the alarm. In some examples, the process value may change color based on the defined weight of the alarm. For example, if alarms are weighted on a 0 to 1000 scale, informational alarms may correspond to alarm weights from 0 to 250 and have a violet color, warning alarms may correspond to alarm weights from 251 to 499 and have a yellow color, and critical alarms may correspond to alarm weights 500 and above with a red color. If the input signal quality is determined to be bad, in some examples the dynamo 424 may be highlighted or the border change color.

In the illustrated example, the content of the process tab 416 may include a limiting parameter dynamo 430 in association with a health detail button or icon 432. The limiting parameter dynamo 430 may identify the parameter having the lowest health value. This parameter will correspond to the limiting health parameter 310 provided in the process header 402. Further, by clicking the health detail button 432, a separate window or pop-up 434 may appear providing the current equipment health value for each configured equipment parameter as described above. Additionally, the pop-up 434 may provide an alarm health value that corresponds to the process health value associated with the process parameter having the highest weighted active alarm. In other words, while the asset health value described above determines the most severe parameter (e.g., the parameter having the worst or lowest health value) among both the equipment and process parameters to serve as an estimate of the overall health of the asset, the alarm health value corresponds to the most severe process parameter without considering the equipment parameters. Thus, an operator can assess the health of the equipment asset at varying degrees of granularity. For example, an overall health value (e.g., the asset health value) may be provided as determined by the limiting parameter associated with the lowest health value among both the equipment and process health values. Further, an alarm health value may be provided as determined by the limiting process parameter associated with the highest weighted active alarm. Additionally, as will be discussed in greater detail below, an operator can drill down further to assess the health value for every individual parameter.

FIG. 5 illustrates the example input tab 418 of the example asset overview page 400 of FIG. 4 associated with the user interface 208 of FIG. 2. As illustrated in FIG. 5, within the inputs tab 418 an input table 502 is provided with a parameter column 504, a current column 506, an average column 508, and a baseline column 510. The parameter column 504 lists each parameter associated with the asset. In some examples the parameters may be grouped by type. The current column 506 provides the current value and corresponding units associated with each parameter of the parameter column 504. In some examples, the parameter values in the second column may change appearance in the same manner as the corresponding dynamo 424 of FIG. 4. That is, inputs that have a bad signal condition may be identified by a colored bordered 512 surrounding the parameter value, parameters associated with active and unacknowledged alarms may blink at one second intervals, and parameters associated with acknowledged alarms may change color based on the severity of the alarm as determined by its configured weight. Furthermore, in some examples, the current column 506 may also include alarm symbols 514 to indicate the condition of active alarms (e.g., Hi, Low, Trending up/down, etc.). In the illustrated example, values for any parameter that is disabled will not be shown but an indication 516 may be rendered in their place.

The average column 508 provides average values for the corresponding monitored parameters based on a running average. The baseline column 510 provides the configured baseline data associated with each of the parameters. As discussed above, the baseline data serves as a reference from which limits may be calculated and equipment health values may be determined. The baseline data may be captured from the corresponding values of the parameters being monitored. In some examples, the baseline data may be captured when the asset is running at normal operating conditions. In the illustrated example, to capture the baseline data an operator may click on a title 518 of the baseline column 510, after which a prompt may appear to confirm whether new baseline data is to be captured to calculate new limits and any associated alarm limits. Once confirmed, the baseline data is automatically updated with the current values for each parameter.

The values of each parameter within the input table 502 of FIG. 5 may be historically archived in the database 216 of FIG. 2. In this manner, an operator may select any of the values (current, average, or baseline) associated with a parameter listed in the table 502 to generate a trend graph 520 shown within a trend window 522. In some examples, multiple parameters within a particular group may be selected and plotted along the trend graph 520 at the same time for comparison. Multiple duration buttons 524 may be provided to automatically adjust the time scale of the trend graph 520. In some examples, an operator may also scroll along the trend graph 520 via a scroll bar 526. However, if a check box 528 next to the scroll bar 526 is checked, the scroll bar 526 is locked and the time scale of the trend graph 520 is adjusted to a preconfigured duration. An example zoom button 530 enables operators to toggle between the trend window 522 filling the entire space of the input tab 418 or only a portion as shown in the illustrated example of FIG. 5. The trend window 522 may also provide a scale button 532 to enable an operator to adjust the scale of the Y axis of the trend graph 520. In some examples, if the operator does not set the scale of the Y axis, the asset monitoring application 206 may automatically determine a suitable scale.

As shown in the illustrated example of FIG. 5, the inputs tab 418 may also include an alarms window 534. The alarms window 534 may provide a list of all alarms along with their activation and deactivation times. In some examples, unacknowledged alarms blink until acknowledged. Once an alarm condition returns to normal, the corresponding alarm may be removed from the alarms window 534.

FIG. 6 illustrates the example configuration tab 420 of the example asset overview page 400 of FIG. 4 associated with the user interface 208 of FIG. 2. To enable operators to monitor and assess the condition, health integrity, and/or performance of an asset and/or predict the likelihood of potential asset failures earlier on based on the alarms and health values described above, the alarms are to be configured, which typically occurs prior to beginning to monitor the asset based on process requirements. However, any of the configuration settings may be changed at anytime later while monitoring the asset. Whether configuring monitored parameters before monitoring an asset or after the asset has been brought into service and is already being monitored, an operator accomplishes the configurations via the configuration tab 420 illustrated in FIG. 6.

The configuration tab 420 in the illustrated example includes an input limits table 602. The input limits table 602 includes a parameter column 604 and a current column 606 containing the same information as described above for the parameter column 504 and current column 506 described in FIG. 5. Additionally, the input limits table 602 contains a low limit column 608 and a high limit column 610. The low limit column 608 lists a configured low limit value for each corresponding parameter along with checkboxes 612 to enable or suppress an alarm associated with the low limit. Similarly, the high limit column 610 lists a configured high limit value for each corresponding parameter along with checkboxes 614 to enable or suppress an alarm associated with the high limit. Where the alarm limits associated with a parameter have not been configured, no values are shown for the parameter or its limits, but an indication 616 may be in their place and the checkboxes 612, 614 may be grayed out.

When an operator clicks on one of the parameters in the input limits table 602, an example alarm configuration window 618 may appear. In some examples, only operators with proper user privileges may access the alarm configuration window 618. The alarm configuration window 618 may vary depending on the type of parameter being configured. For example, the alarm configuration window 618 of FIG. 6 is for configuring vibration parameters, which apply to rotary type assets (e.g., pumps, blowers, etc.). As described above, vibration limits may be calculated based on the asset speed in accordance with IEC guidelines. In the example alarm configuration window 618, the currently configured low limit 620 may be provided. Associated with the low limit 620 is an enable auto limit checkbox 622 which, when selected, recalculates the low limit when new baseline data is captured from the asset. When the checkbox 622 is unchecked, the limit retains its entered value when the new baseline data is captured. A similar high limit 624 and corresponding enable auto limit checkbox 626 may also be provided within the alarm configuration window 618. Additionally, the alarm configuration window 618 of the illustrated example may also include an operator multiplying factor 628, a mathematical formula 630, an average value 632 of the parameter, a baseline 634, a high trend value 636, and a high trend limit equation 638. In the illustrated example, each of these parameters may be used to calculate corresponding limits. The multiplying factor 628 enables an operator the ability to adjust the associated limits calculated by the mathematical formula 630. The baseline 634 in the illustrated example provides the most recent baseline data captured for the corresponding parameter. The baseline 634 may be updated every time the baseline data capture operation is implemented. However, the baseline 634 may also be manually edited by the operator.

In some examples, rather than calculating the limits (e.g., the low limit 620 and/or the high limit 624) based on the above mentioned configuration variables, the limits may be manually entered by an operator. In such examples, the low limit 620 and/or high limit 624 may subsequently be recalculated based on the current baseline data and the current configuration variables described above by selecting the Reset limits button 639 of the configuration tab 420. In the illustrated example, the Reset limits button 639 recalculates (e.g., resets) limits for all equipment and process parameters associated with the asset. However, the Reset limits button 639 only becomes functional when the enable auto limit checkboxes 622, 626 are checked for a limit corresponding to any of the equipment or process parameters. If the checkboxes 622, 624 are not checked, the corresponding limit will retain its current value.

The high trend 636 corresponds to a set point from which a trend alarm may be determined (e.g., increasing, decreasing, large change, etc.), while the high trend limit equation 638 provides the mathematical formula by which the alarm limit is calculated. Based on the frequency of polling values corresponding to vibration parameters (which may be, for example, every thirty minutes), statistical process control (SPC) techniques are used to identify statistically significant shifts in the vibration readings for fixed speed assets. The high trend 636 may be adjusted depending on the particular conditions of the asset and/or the corresponding process (e.g., smooth, normal, rough). Furthermore, the particular parameters used in the SPC calculations may be configured by selecting an SPC limits button 640 shown in the configuration tab 420 to open an SPC limits window discussed below in connection with FIG. 7.

Figure 7:
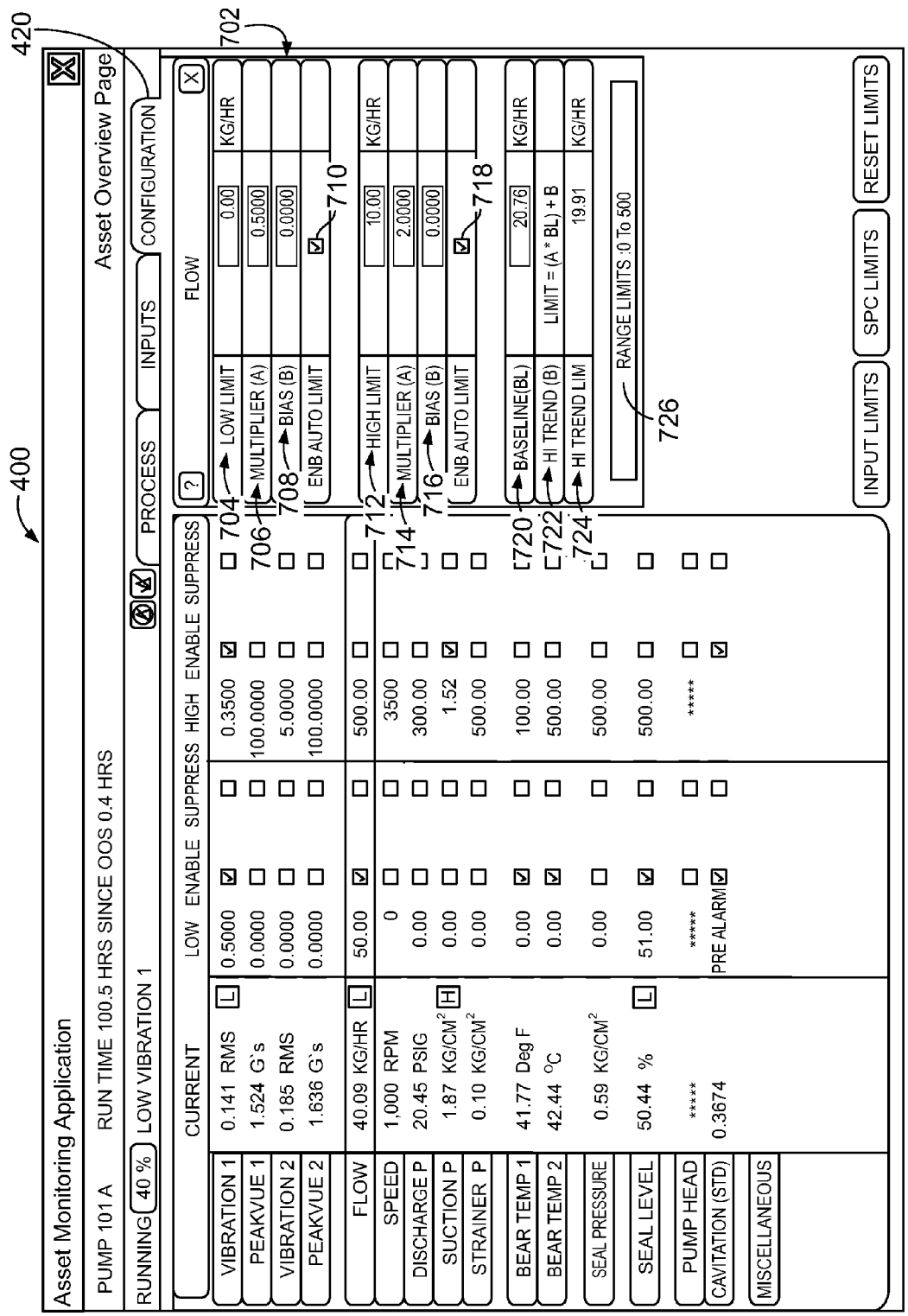
FIG. 7 illustrates another example alarm configuration window in the configuration tab of the example asset overview page of FIG. 6.

Variables for non-vibrational parameters may be configured in much the same way as described above. For example, FIG. 7 illustrates another example alarm configuration window 702 in the configuration tab 420 of the example asset overview page 400 of FIG. 6. In the illustrated example of FIG. 7, the configuration window 702 is associated with a flow process parameter. In the illustrated example, the alarm configuration window 702 provides the current configured low limit 704 along with a corresponding multiplier 706, a bias 708, and an enable auto limit checkbox 710. The multiplier 706 and the bias 708 are factors an operator can configure to adjust the resulting low limit 704. The enable auto limit checkbox 710 determines whether the low limit 704 is updated as described above in FIG. 6. The alarm configuration window 702 of the illustrated example also provides a high limit 712 with a corresponding multiplier 714, a bias 716, and an enable auto limit checkbox 718. Additionally, the alarm configuration window 702 may provide a current baseline 720, a limit formula 722 to calculate the limits, and an average value 724 of the corresponding parameter. Further, the alarm configuration window 702 of the illustrated example includes an allowable range 726 of values correspond to each editable variable selected to assist an operator in configuring the limits for the parameter.

Figure 8:
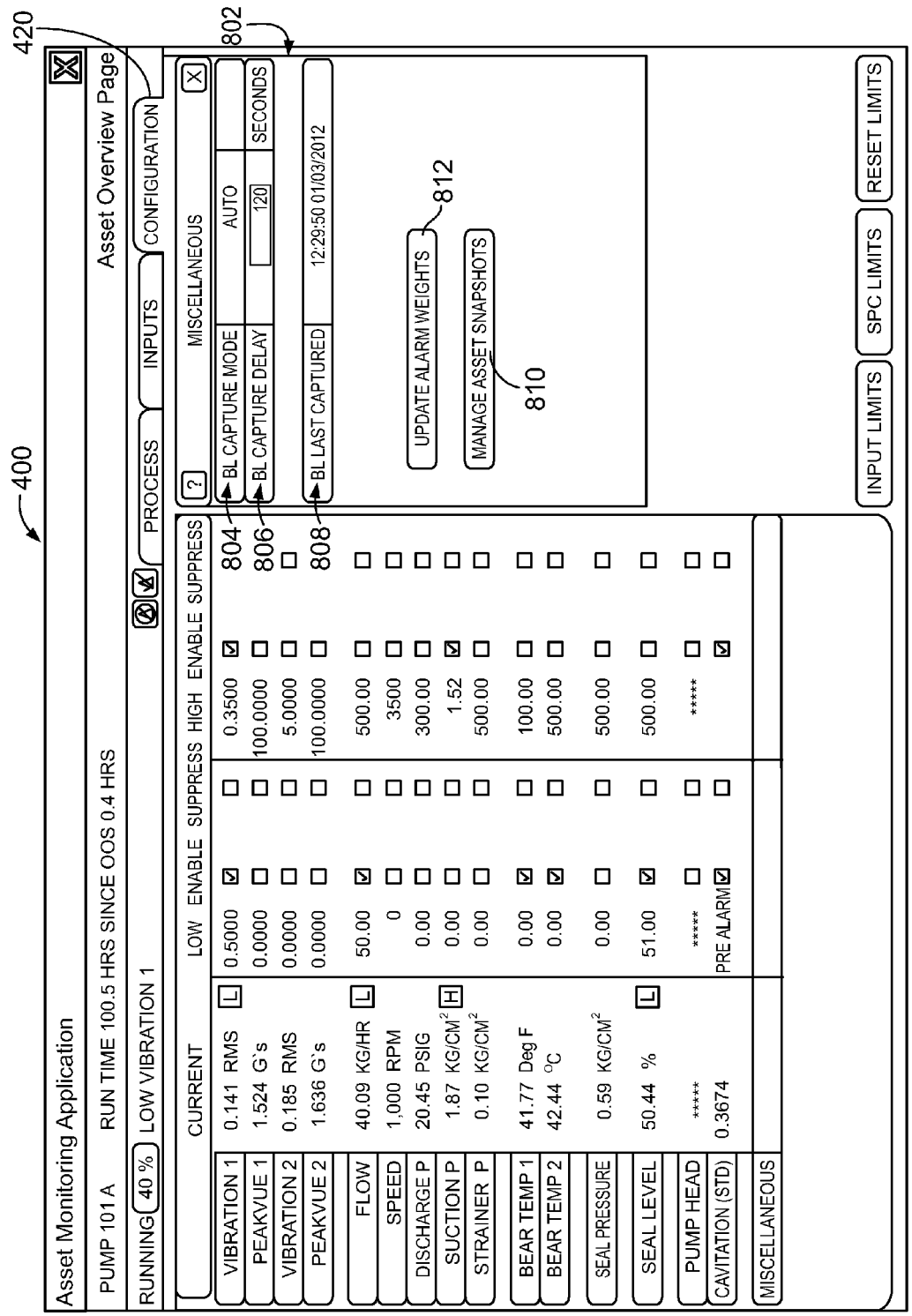
FIG. 8 illustrates the example configuration tab of the example asset overview page of FIG. 6 showing an example miscellaneous configuration window.

FIG. 8 illustrates the example configuration tab 420 of the example asset overview page 400 of FIG. 6 showing an example miscellaneous configuration window 802 to configure aspects of the asset monitoring application 206 relating to monitoring functions other than alarms. For example, a baseline capture mode 804 may be configured as either automatic or manual. When the mode 804 is automatic, the baseline data will be captured automatically once the corresponding asset is brought into service after a baseline delay period 806. When the mode 804 is set to manual, an operator manually issues a command to capture baseline data as described above. The example miscellaneous configuration window 802 of the illustrated example also provides a timestamp 808 indicating when the baseline data was last captured. In some examples, the value of the timestamp 808 may turn red if a preconfigured time value has been exceeded since the baseline data was last captured.

The illustrated example miscellaneous configuration window 802 also includes an asset snapshot configuration button 810. A snapshot is a stored set of data corresponding to captured baseline data for an asset along with the associated configuration settings. As discussed above, the captured baseline data of an asset represents the values of all asset parameters during normal operating conditions. However, some assets may have multiple operating conditions (e.g., forward and reverse on a fin fan). Accordingly, in some instances it is helpful to capture multiple sets of baseline data representing different operating conditions. As different baseline data set may correspond to different configuration settings, selecting the snapshot button 810 enables an operator to save and store a snapshot of the current baseline data and corresponding settings. Furthermore, the snapshot button 810 may also enable an operator to load any previously saved baseline data and corresponding configuration settings.

Figure 9:
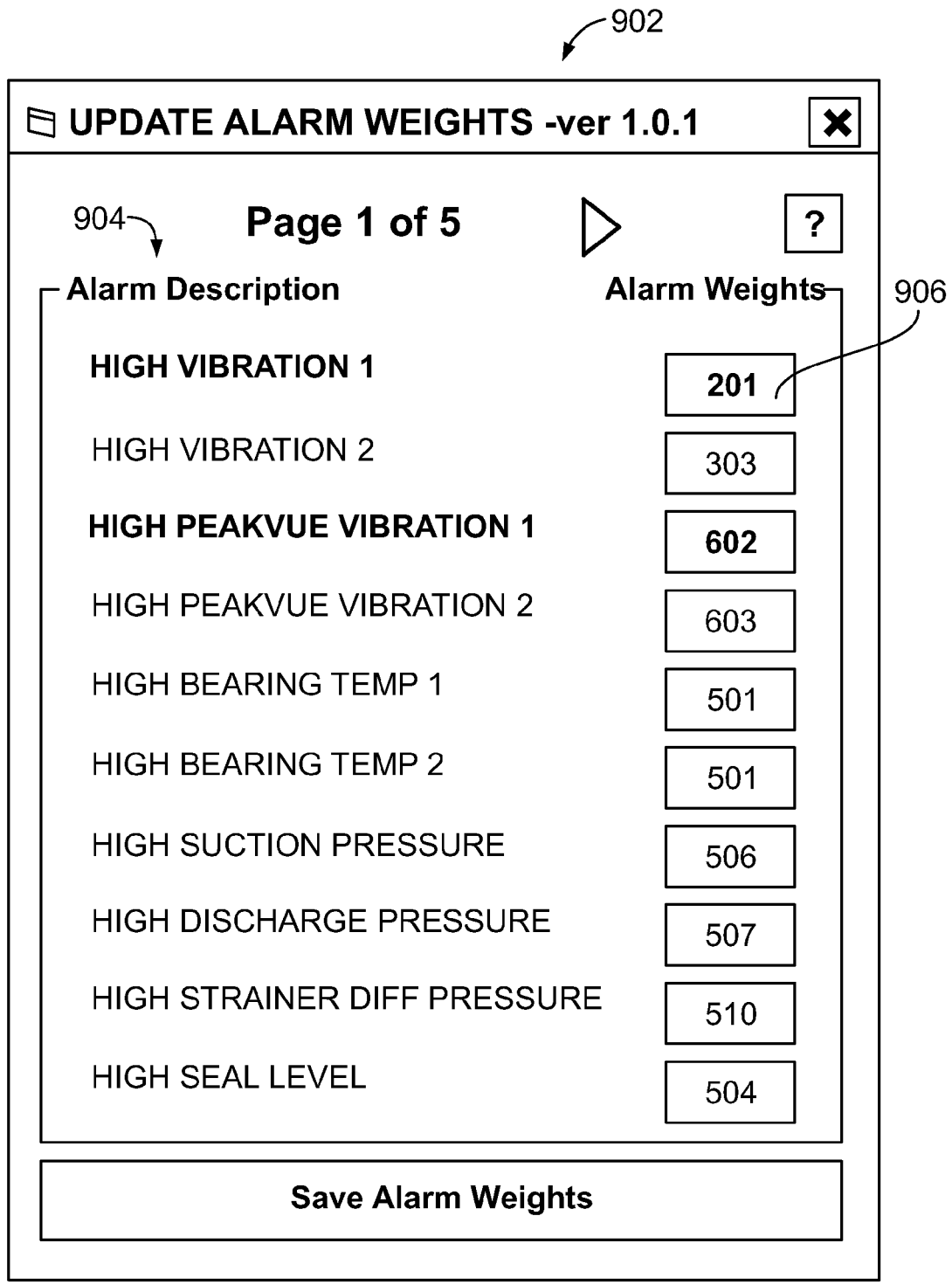
FIG. 9 illustrates an example alarm weight configuration window.

The example miscellaneous configuration window 802 may also include an example update alarm weight button 812. Selecting the alarm weight button 812 may open an example alarm weight configuration window 902 as illustrated in FIG. 9. The alarm weight configuration window 902 provides a list 904 of all alarms defined for the particular asset along with a corresponding alarm weight 906. In some examples, alarms that are not enabled are grayed out such that they cannot be edited. However, if an operator edits the alarms that are enabled, the operator may then save the changes to put the changes into effect.

Figure 10:
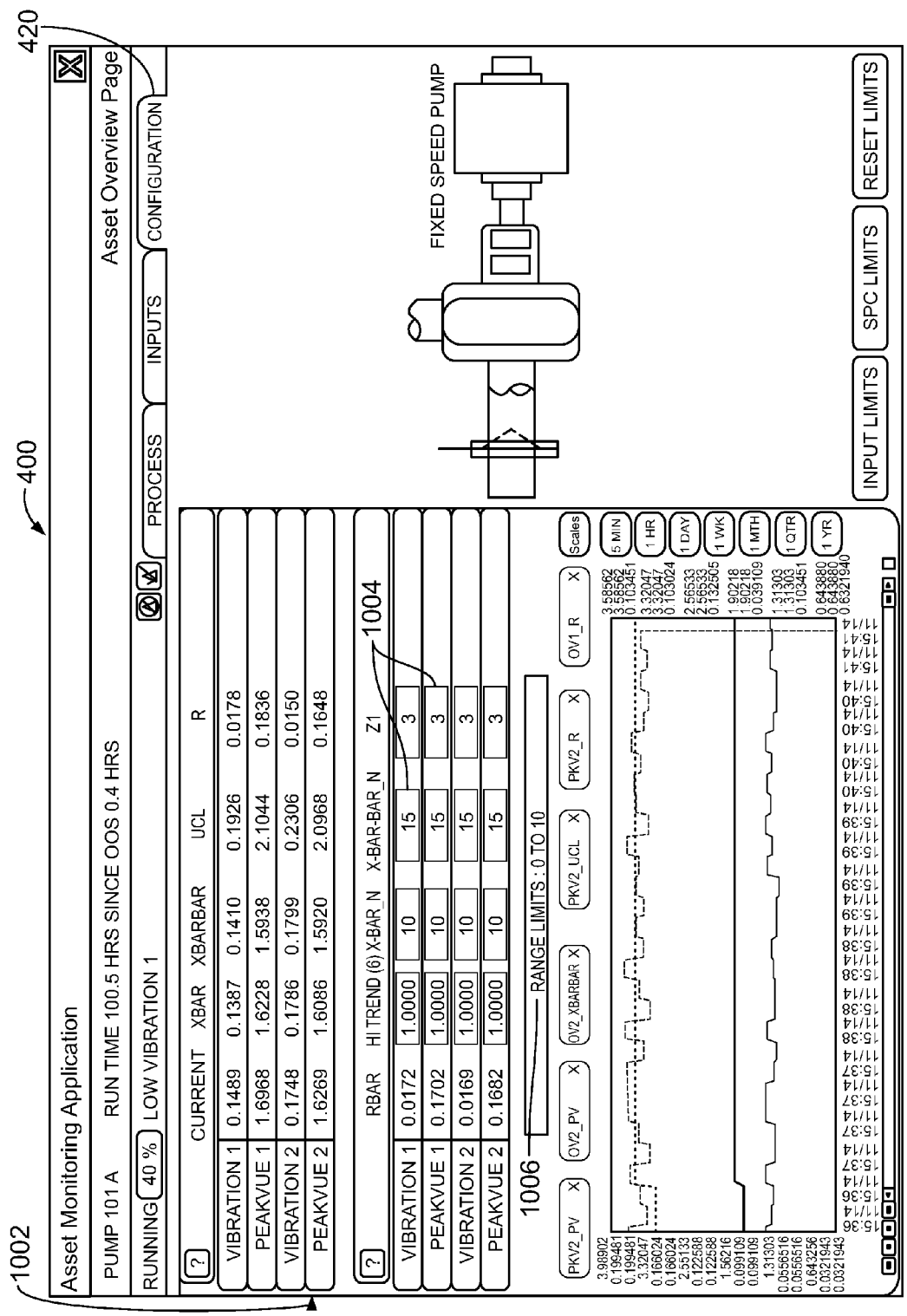
FIG. 10 illustrates an example statistical process control (SPC) configuration window within the example configuration tab of the example asset overview page of FIG. 6

FIG. 10 illustrates an example statistical process control (SPC) configuration window 1002 within the example configuration tab of the example asset overview page 400 of FIG. 6. As mentioned above, an operator may access the SPC configuration window 1002 by selecting the SPC limits button 640 on the configuration tab 420. The SPC limits button 640 may only be shown for assets that implement SPC evaluation techniques, such as assets monitored for vibrations. The SPC limits window 1002 provides all the relevant values associated with each of the vibration based parameters. In the illustrated example, boxed values 1004 may be edited by an operator to adjust the resulting output of the SPC calculations. In some examples, when one of the boxed values 1004 is selected, an allowable range 1006 of inputs for the selected value may be shown to assist the operator in selecting appropriate values. For example, in the illustration of FIG. 10, the X_BAR_N variable is selected for the PEAKVUE 2 parameter and the allowable range for the variable is 0 to 10. A similar allowable range 642 is provided in the alarm configuration window 618 for each editable variable shown in FIG. 6. Just as an operator may access the SPC limits window 1002 via the SPC limits button 640, the operator may return to and/or access the input limits window 602 by selecting the input limits button 644 on the configuration tab 420.

Figure 11:
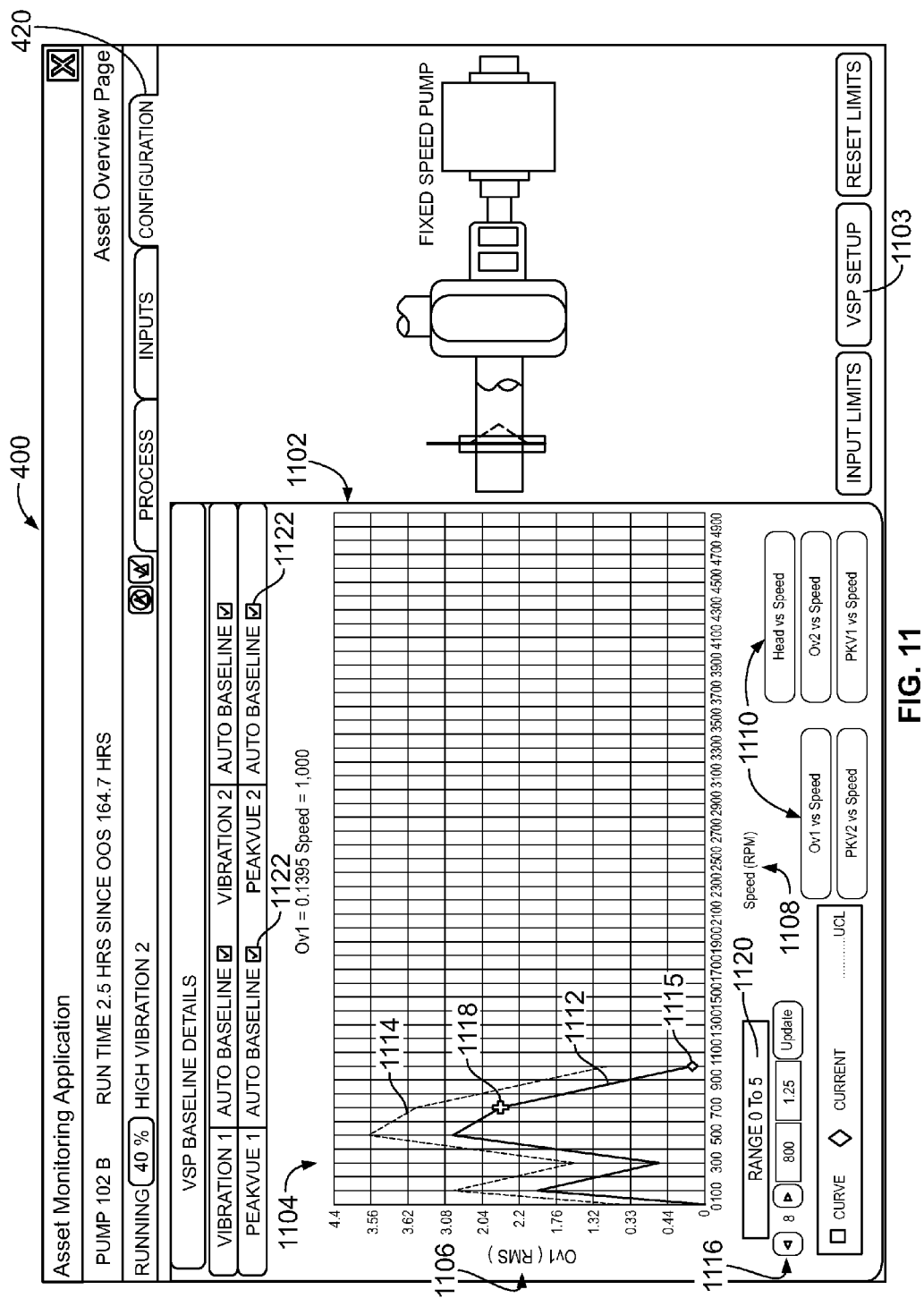
FIG. 11 illustrates an example variable state parameter (VSP) configuration window.

FIG. 11 illustrates an example variable state parameter (VSP) configuration window 1102 of the configuration tab 420. The VSP configuration window 1102 may be accessed by selecting a VSP Setup button 1103 included on the configuration tab 420. The VSP Setup button 1103 may only appear for assets that are associated with parameters monitored in connection with a VSP. As described above, some asset parameters (e.g., vibrations) vary as a function of a VSP and, therefore, require dynamic baseline data to serve as a reference of normal operating conditions across the operating range of the VSP. In the example VSP configuration window 1102 a characteristic curve or signature that serves as dynamic baseline data for the dependent variable is plotted in a graph 1104 from which an operator may view and/or edit the asset signature. In capturing the signature, the monitored parameter is plotted along the Y axis 1106 for various points throughout the range of the VSP plotted along the X axis 1108 of the graph 1104. Graph buttons 1110 may be selected to display the signature corresponding to each relevant dependent parameter being monitored. The signature is represented in the graph 1104 as a solid line 1112, while a broken or dotted line 1114 represents the upper limit or high trend value for the parameter being monitored. A diamond 1115 may show the current value of the parameter within the graph 1104.

While the characteristic curve or signature may be automatically captured, an operator may edit the curve by selecting each plotted point through arrow buttons 1116. A crosshair 1118 on the signature line 1112 identifies the current point selected for editing and the corresponding X and Y values are shown next to the arrow buttons 1116. When a particular point is selected for editing, as shown in the illustrated example of FIG. 11, an allowable range 1120 appears to prevent the operator from selecting an inappropriate value. Above the graph 1104 in the illustrated example, each relevant parameter is listed along with a checkbox 1122. When the checkbox 1122 is checked the signature curve will be initialized to all '0' values every time the asset is taken out of service. However, if the checkbox 1122 is not checked, the signature curve is retained until changed manually.

Figure 12:
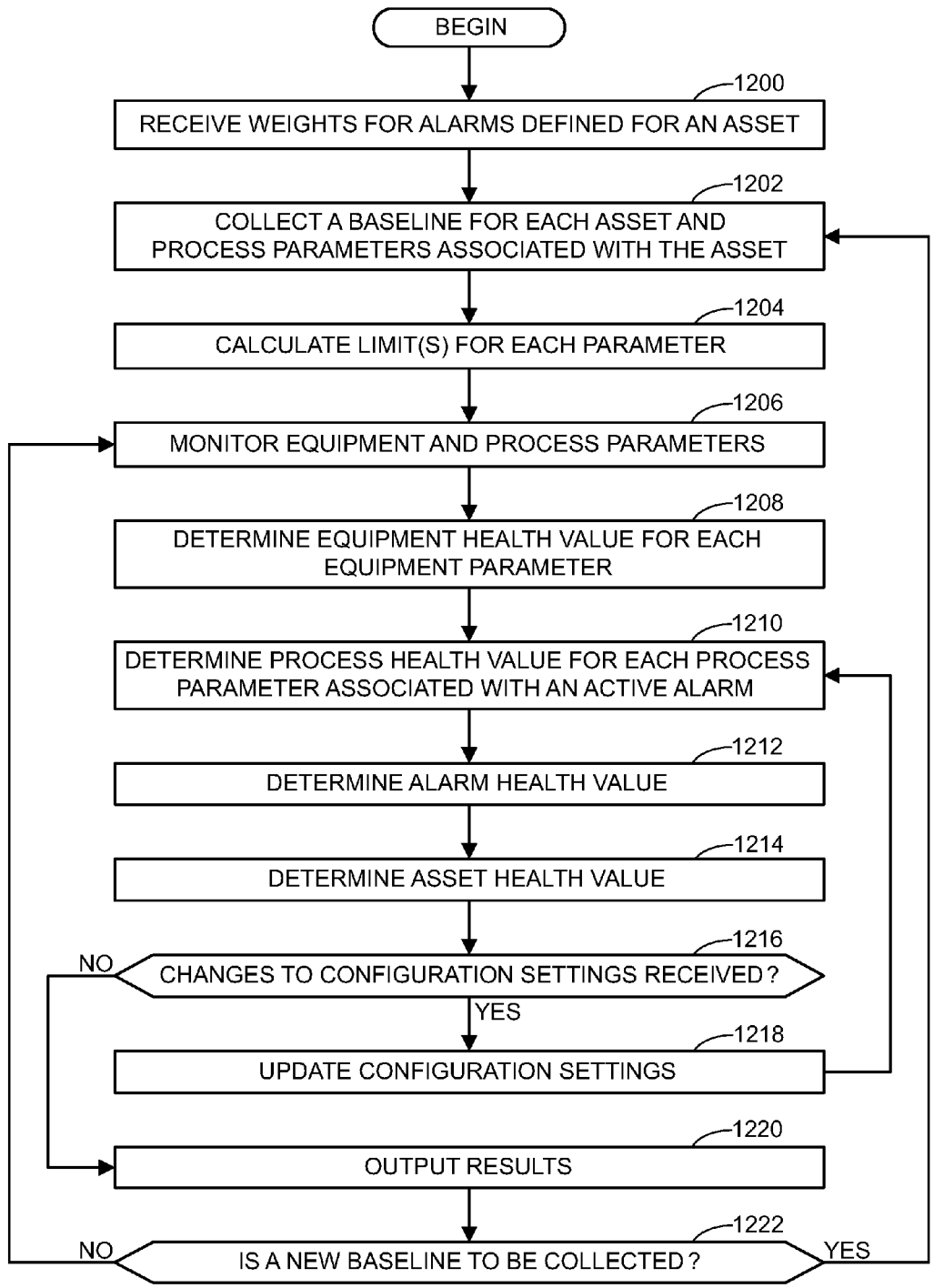
FIG. 12 is a flowchart representative of an example process that may be carried out to implement the example asset monitoring application 206 of FIG. 2 and/or, more generally, the example operator station of FIG. 1 and/or 2.

FIG. 12 is a flowchart representative of an example process that may be carried out to implement the example asset monitoring application 206 of FIG. 2 and/or, more generally, the example application station 106 of FIG. 1 and/or 2. More particularly, the example process of FIG. 12 may be representative of machine readable instructions that comprise a program for execution by a processor such as the processor 1312 shown in the example computer 1300 discussed below in connection with FIG. 13. The program may be embodied in software stored on a tangible computer readable medium such as a CD-ROM, a floppy disk, a hard drive, a digital versatile disk (DVD), a BluRay disk, or a memory associated with the processor 1312. Alternatively, some or all of the example process of FIG. 12 may be implemented using any combination(s) of application specific integrated circuit(s) (ASIC(s)), programmable logic device(s) (PLD(s)), field programmable logic device(s) (FPLD(s)), discrete logic, hardware, firmware, etc. Also, one or more of the example operations of FIG. 12 may be implemented manually or as any combination(s) of any of the foregoing techniques, for example, any combination of firmware, software, discrete logic and/or hardware. Further, although the example process is described with reference to the flowchart illustrated in FIG. 12, many other methods of implementing the example asset monitoring application 206 of FIG. 2 and/or the example application station 106 of FIG. 1 and/or 2 may alternatively be used. For example, the order of execution of the blocks may be changed, and/or some of the blocks described may be changed, eliminated, or combined. Additionally, any or all of the example process of FIG. 12 may be performed sequentially and/or in parallel by, for example, separate processing threads, processors, devices, discrete logic, circuits, etc.

As mentioned above, the example process of FIG. 12 may be implemented using coded instructions (e.g., computer readable instructions) stored on a tangible computer readable medium such as a hard disk drive, a flash memory, a read-only memory (ROM), a compact disk (CD), a digital versatile disk (DVD), a cache, a random-access memory (RAM) and/or any other storage media in which information is stored for any duration (e.g., for extended time periods, permanently, brief instances, for temporarily buffering, and/or for caching of the information). As used herein, the term tangible computer readable medium is expressly defined to include any type of computer readable storage and to exclude propagating signals. Additionally or alternatively, the example process of FIG. 12 may be implemented using coded instructions (e.g., computer readable instructions) stored on a non-transitory computer readable medium such as a hard disk drive, a flash memory, a read-only memory, a compact disk, a digital versatile disk, a cache, a random-access memory and/or any other storage media in which information is stored for any duration (e.g., for extended time periods, permanently, brief instances, for temporarily buffering, and/or for caching of the information). As used herein, the term non-transitory computer readable medium is expressly defined to include any type of computer readable medium and to exclude propagating signals. As used herein, when the phrase "at least" is used as the transition term in a preamble of a claim, it is open-ended in the same manner as the term "comprising" is open ended. Thus, a claim using "at least" as the transition term in its preamble may include elements in addition to those expressly recited in the claim.

The example process of FIG. 12 begins by receiving weights for each alarm defined for an asset (block 1200) (e.g., via the example asset monitoring application 206 of FIG. 2). The weights may apply to alarms associated with process parameters and/or equipment parameters. In some examples, the alarm weights may be set to default values. In other examples, an operator may input and/or edit the alarm weights.

The example process of FIG. 12 includes collecting baseline data for each equipment and process parameter associated with the asset (block 1202) (e.g., via the example asset monitoring application 206 of FIG. 2). The baseline data may be collected via an operator inputting the data or the baseline data may be captured from the monitored parameters during normal operating conditions. For some assets, multiple sets of baseline data may be collected and/or stored to be applied during different operating conditions. Further, where a monitored parameter of an asset varies as a function of a variable state parameter (VSP), a characteristic curve or signature may be collected that corresponds to the baseline data of the parameter against the VSP over its entire operating range.

The example process of FIG. 12 includes calculating one or more limits for each parameter to be monitored (block 1204) (e.g., via the example equipment parameter analyzer 210 of FIG. 2). The limits may serve as an end opposite the baseline data to define a range of operation for a parameter from which an equipment health value may be determined. Such limits may be calculated using mathematical formulae set by standards guidelines that are a function of the captured baseline data. Furthermore, the limits may also serve as alarm limits that may trigger an alarm if the parameter traverses the limit.

The example process of FIG. 12 further monitors the equipment and process parameters associated with the asset (block 1206) (e.g., via the example field devices 110, 112, 114, 120, 122 of FIG. 1). In some examples, as the parameters are monitored the values are also historically archived or stored (e.g., in the example database 216 of FIG. 2). With the parameters being monitored, the example process of FIG. 12 determines an equipment health value for each equipment parameter (block 1208) (e.g., via the example equipment parameter analyzer 210). The equipment health value is a numerical indication of the deviation of the parameter from its corresponding baseline data. More particularly, the equipment health parameter may be represented as a percentage defining the relative position along the range between the baseline and the corresponding limit(s). As the deviation increases, the percentage decreases indicating an increasingly severe condition. Additionally, the example process of FIG. 12 determines a process health value for each process parameter associated with an active alarm (block 1210) (e.g., via the example process parameter analyzer 212). The process health parameter is associated with the weight assigned to the corresponding alarm where a higher weight is indicative of a more severe alarm. In some examples, the process health parameter may be represented as the complement of the weight adjusted to a 100 point scale to enable direct comparison to the equipment health values expressed as a percentage.

The example process of FIG. 12 determines an alarm health value (block 1212) (e.g., via the example process parameter analyzer 212 of FIG. 2). The alarm health value corresponds to the most severe process health value (which corresponds to the highest weighted active alarm). The example process of FIG. 12 further includes determining an asset health value (block 1214) (e.g., via the example asset health value calculator 214 of FIG. 2). The asset health value is representative of an overall health assessment of the asset and may be based on a limiting parameter having the least or worst health value. That is, the asset health value corresponds to the lowest value of all the equipment health values and the process health values.

The example process of FIG. 12 determines whether any changes to configuration settings for the asset being monitored have been received (block 1216) (e.g., via the example asset monitoring application 206 of FIG. 2). Changes to the configuration settings may apply to any aspect of the parameters and/or other variables relevant to monitoring the asset including the alarm weights and/or the variables and/or multiplying factors to calculate the limits from the captured baseline data. If changes have been received, the example process of FIG. 12 updates the appropriate variables (block 1218) and control then returns to blocks 1208-1214 to determine any changes to the equipment health values (block 1208), the process health values (block 1210), the alarm health value (block 1212), and the asset health value (block 1214) based on the updated configuration settings. If no changes to the configuration settings are received (block 1216), the example process outputs results (block 1220) (e.g., via the example user interface 208 of FIG. 2). The output results represent the various health values determined and/or the alarms, alarm severities, parameters, parameter values, and/or other configured settings associated with the monitoring of the asset.

The example process of FIG. 12 also may determine whether new baseline data is to be collected (block 1222). In some examples, whether to collect new baseline data may depend on a preconfigured schedule. If new baseline data is to be collected, the example process of FIG. 12 returns to block 1202 to collect the baseline data. If no new baseline data is to be collected, the example process of FIG. 12 returns to block 1206 to continue monitoring the equipment and process parameters.

Figure 13:
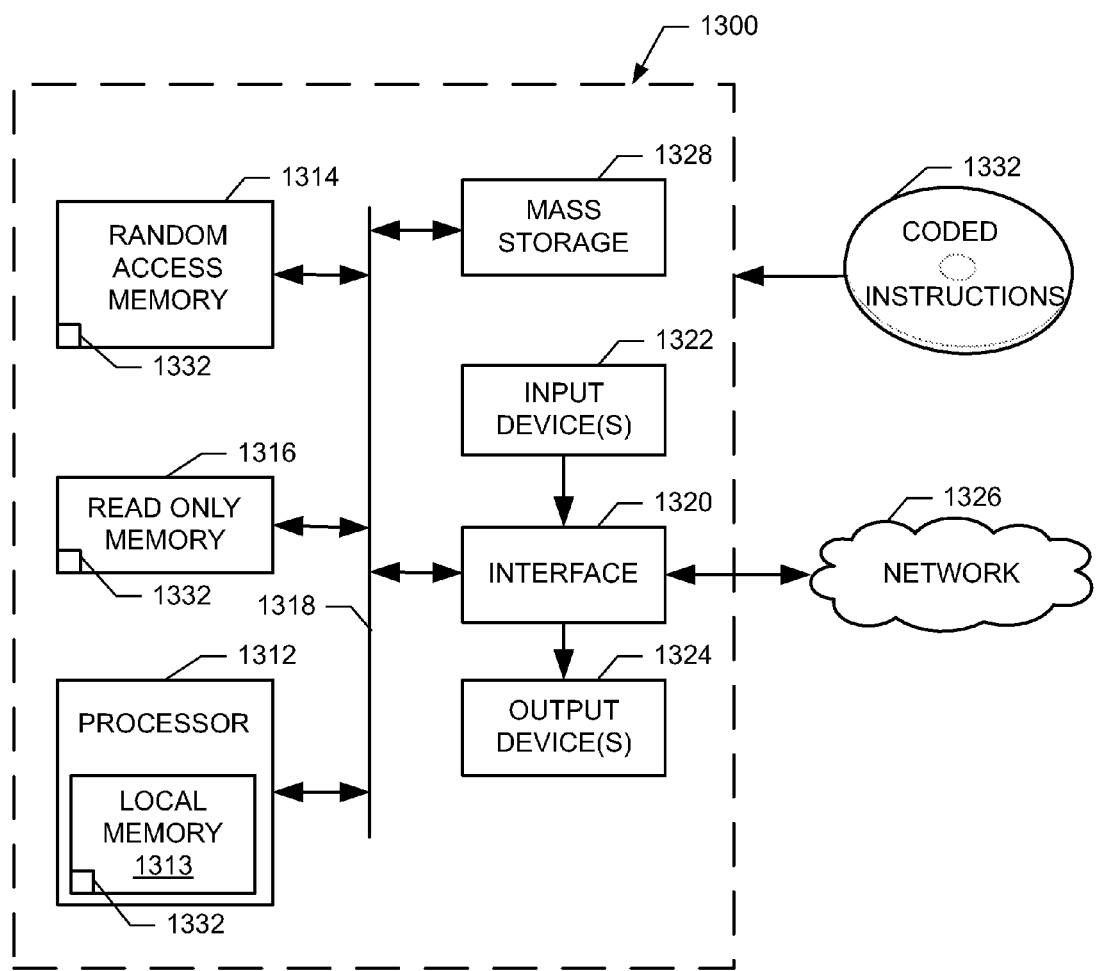
FIG. 13 is a schematic illustration of an example computer 1300 that may be used and/or programmed to carry out the example process of FIG. 12 and/or, more generally, to implement the asset monitoring application 206, and/or the example operator station 104 of FIGS. 1 and/or 2.

FIG. 13 is a schematic illustration of an example computer 1300 that may be used and/or programmed to carry out the example process of FIG. 12 and/or, more generally, to implement the asset monitoring application 206, and/or the example application station 106 of FIG. 1 and/or 2. The computer 1300 of the instant example includes a processor 1312. For example, the processor 1312 can be implemented by one or more microprocessors or controllers from any desired family or manufacturer.

The processor 1312 includes a local memory 1313 (e.g., a cache) and is in communication with a main memory including a volatile memory 1314 and a non-volatile memory 1316 via a bus 1318. The volatile memory 1314 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1316 may be implemented by flash memory and/or any other desired type of memory device. Access to the main memory 1314 and 1316 is controlled by a memory controller.

The computer 1300 also includes an interface circuit 1320. The interface circuit 1320 may be implemented by any type of interface standard, such as an Ethernet interface, a universal serial bus (USB), and/or a PCI express interface. One or more input devices 1322 are connected to the interface circuit 1320. The input device(s) 1322 permit a user to enter data and commands into the processor 1312. The input device(s) can be implemented by, for example, a keyboard, a mouse, a touchscreen, a track-pad, a trackball, isopoint and/or a voice recognition system. One or more output devices 1324 are also connected to the interface circuit 1320. The output devices 1324 can be implemented, for example, by display devices (e.g., a liquid crystal display, a cathode ray tube display (CRT), a printer and/or speakers). The interface circuit 1320, thus, typically includes a graphics driver card.

The interface circuit 1320 also includes a communication device such as a modem or network interface card to facilitate exchange of data with external computers via a network 1326 (e.g., an Ethernet connection, a digital subscriber line (DSL), a telephone line, coaxial cable, a cellular telephone system, etc.).

The computer 1300 also includes one or more mass storage devices 1328 for storing software and data. Examples of such mass storage devices 1328 include floppy disk drives, hard drive disks, compact disk drives and digital versatile disk (DVD) drives.

Coded instructions 1332 to implement the example process of FIG. 12 may be stored in the mass storage device 1328, in the volatile memory 1314, in the non-volatile memory 1316, and/or on a removable storage medium such as a CD or DVD.

Although certain example methods, apparatus and articles of manufacture have been described herein, the scope of coverage of this patent is not limited thereto. Such examples are intended to be non-limiting illustrative examples. On the contrary, this patent covers all methods, apparatus and articles of manufacture fairly falling within the scope of the appended claims either literally or under the doctrine of equivalents.

What is claimed is:

1. A method comprising:
monitoring an equipment parameter associated with an asset in an operating process unit;
calculating an equipment health value associated with the equipment parameter, the equipment health value based on a relationship of a value of the equipment parameter to a range between baseline data and a corresponding limit;
monitoring a process parameter associated with the asset;
calculating an alarm health value when a value of the process parameter triggers an associated alarm, the alarm health value corresponding to a fixed value based on an assigned weight of the alarm relative to different alarms associated with different process parameters; and
determining an asset health value corresponding to the asset based on the equipment health value and the alarm health value, the asset health value indicative of an overall health of the asset; and
implementing a remedial action associated with the asset to improve the overall health of the asset when the asset health value fails to satisfy a threshold.

2. The method of claim 1, wherein the baseline data corresponds to at least one of a value of the equipment parameter measured when the asset is operating in a normal condition or a signature of values of the equipment parameter measured across an operating range of a corresponding variable state parameter.

3. The method of claim 1, further comprising receiving the weight for the alarm associated with the process parameter from an operator.

4. The method of claim 1, wherein the asset health value is indicative of at least one of a performance of the asset, or a likelihood of failure of the asset.

5. The method of claim 1, wherein monitoring the equipment and process parameters includes monitoring via a wireless communication protocol.

6. The method of claim 1, wherein the asset is a pump, a heat exchanger, an air cooled exchanger, a furnace, a fired heater, a blower, a fin fan, a cooling tower, a distillation column, a compressor, a pipe, a valve, a vessel, a well head, a tank, a boiler, a steam trap, dryer, kiln, reactor, oil fractionator, separator, desalter, crusher, smelter, cyclone, or a centrifuge.

7. The method of claim 1, wherein monitoring the equipment and process parameters includes online monitoring to enable substantially continuous calculation of the asset health value.

8. The method of claim 1, further comprising
rendering an area view of a graphical user interface, the area view corresponding to any of a process plant, an area of the operating process unit, or an asset type;
rendering, in the area view, a first graphic corresponding to the asset, wherein the asset is associated with the area;
rendering, in the area view, one or more second graphics corresponding to one or more second assets associated with the area; and
modifying at least one of the first graphic or the one or more second graphics in the view to indicate the asset health value and one or more second asset health values corresponding to the one or more second assets.

9. The method of claim 1, wherein the equipment parameter corresponds to a parameter associated with at least one of a condition, a health, an integrity, or a performance of the asset, and wherein the process parameter corresponds to a parameter associated with control and operation of the operating process unit.

10. The method of claim 1, further comprising:
calculating the alarm health value by subtracting the assigned weight for the alarm associated with the process parameter from a maximum weight; and
normalizing the equipment health value and the alarm health value to a common scale.

11. A method comprising:
monitoring one or more equipment parameters associated with an asset in an operating process unit;
monitoring one or more process parameters associated with the asset; and
determining an asset health value corresponding to the asset based on the one or more monitored equipment parameters, process parameters, and baseline data associated with the one or more equipment parameters, wherein determining the asset health value includes:
calculating an alarm health value based on a highest weighted active alarm;
calculating one or more equipment health values associated with each of the one or more equipment parameters, the equipment health values to be based on the one or more equipment parameters relative to the baseline data and corresponding limits; and
determining a lowest health value among the alarm health value and the one or more equipment health values; and
implementing a remedial action associated with the asset to increase at least one of the alarm health value or the one or more equipment health values when the alarm health value is below a threshold.

12. The method of claim 11, further comprising:
rendering an asset overview page of a graphical user interface corresponding to the asset; and
displaying at least one of the lowest health value, a tag or name associated with the equipment or process parameter corresponding to the lowest health value, or a list including at least one of the alarm health value or the one or more equipment health values.

13. A system comprising:
sensors to monitor an equipment parameter and a process parameter associated with an asset in an operating process unit; and
a processor to:
receive data collected via the sensors;
calculate an equipment health value associated with the equipment parameter, the equipment health value based on a relationship of a value of the equipment parameter to a range between baseline data and a corresponding limit;
calculate an alarm health value when a value of the process parameter triggers an associated alarm, the alarm health value corresponding to a fixed value based on an assigned weight of the alarm relative to different alarms associated with different process parameters; and
calculate an asset health value of the asset based on the equipment health value and the alarm health value, the asset health value indicative of an overall health of the asset, an operator to take remedial action associated with the asset to improve the overall health of the asset when the asset health value fails to meet a threshold.

14. The system of claim 13, wherein the processor is to receive the data via a wireless communication protocol.

15. The system of claim 13, wherein the asset is a pump, a heat exchanger, an air cooled exchanger, a furnace, a fired heater, a blower, a fin fan, a cooling tower, a distillation column, a compressor, a pipe, a valve, a vessel, a well head, a tank, a boiler, a steam trap, dryer, kiln, reactor, oil fractionator, separator, desalter, crusher, smelter, cyclone, or a centrifuge.

16. A system comprising:
sensors to monitor one or more equipment parameters and one or more process parameters associated with an asset in an operating process unit; and
a processor to receive data collected via the sensors and to calculate an asset health value of the asset based on the one or more equipment parameters and the one or more process parameters, wherein the processor is to calculate the asset health value of the asset by:
calculating an alarm health value based on a highest weighted active alarm associated with one of the one or more process parameters;
calculating one or more equipment health values corresponding to the one or more equipment parameters; and
determining a lowest health value among the alarm health value and the one or more equipment health values, an operator to take remedial action associated with the asset to increase the asset health value when the asset health value falls below a threshold.

17. A tangible article of manufacture storing machine readable instructions which, when executed, cause a machine to at least:
monitor an equipment parameter associated with an asset in an operating process unit;
calculate an equipment health value associated with the equipment parameter, the equipment health value based on a relationship of a value of the equipment parameter to a range between baseline data and a corresponding limit;
monitor a process parameter associated with the asset;
calculate an alarm health value when a value of the process parameter triggers an associated alarm, the alarm health value corresponding to a fixed value based on an assigned weight of the alarm relative to different alarms associated with different process parameters; and determine an asset health value corresponding to the asset based on the equipment health value and the alarm health value, an operator to take action associated with the asset to increase at least one of the equipment health value or the alarm health value when the asset health value is below a threshold.

18. The tangible article of manufacture of claim 17, wherein the equipment parameter corresponds to a parameter associated with at least one of a condition, a health, an integrity, or a performance of the asset, and wherein the process parameter corresponds to a parameter associated with control and operation of the operating process unit.

19. The tangible article of manufacture of claim 17, wherein the asset health value of the asset is indicative of at least one of a performance of the asset, or a likelihood of failure of the asset.

20. A tangible article of manufacture storing machine readable instructions which, when executed, cause a machine to at least:

monitor one or more equipment parameters associated with an asset in an operating process unit;

monitor one or more process parameters associated with the asset; and determine an asset health value corresponding to the asset based on the one or more monitored equipment, the one or more process parameters, and baseline data associated with the one or more equipment parameters, wherein calculating the asset health value of the asset includes:

calculating an alarm health value based on a highest weighted active alarm;

calculating one or more equipment health values associated with each of the one or more equipment parameters, the equipment health values to be based on the one or more equipment parameters relative to the baseline data and corresponding limits; and determining a lowest health value among the alarm health value and the one or more equipment health values based on a common scale, an operator to take action associated with the asset to increase an overall health of the asset when the asset health value is below a threshold.

* * * * *